Aug. 12, 1969 L. VADAS 3,460,596
PINEAPPLE PEELING AND TRIMMING METHOD
Original Filed Nov. 27, 1964 20 Sheets-Sheet 9
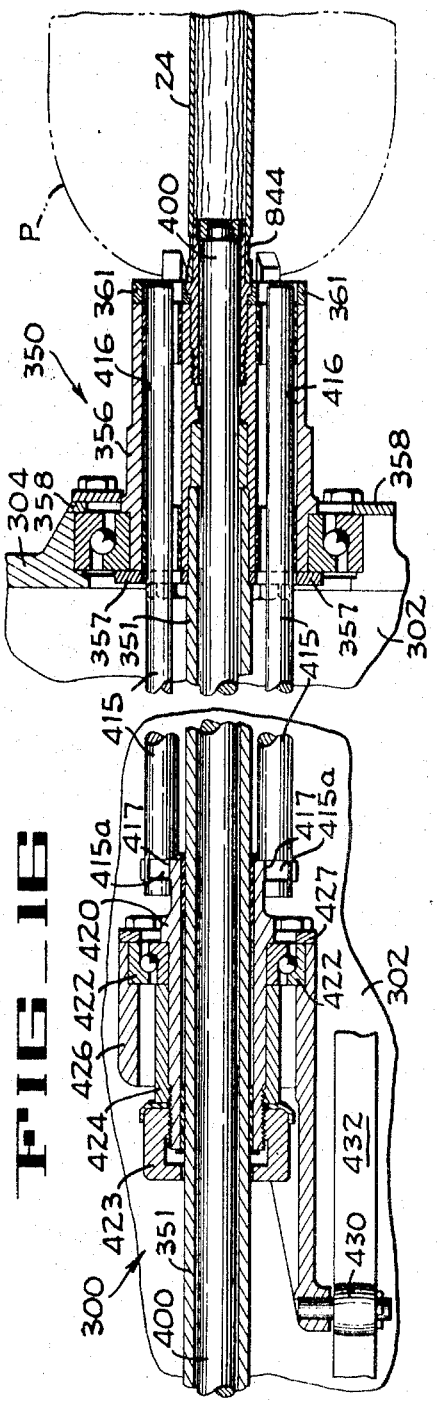
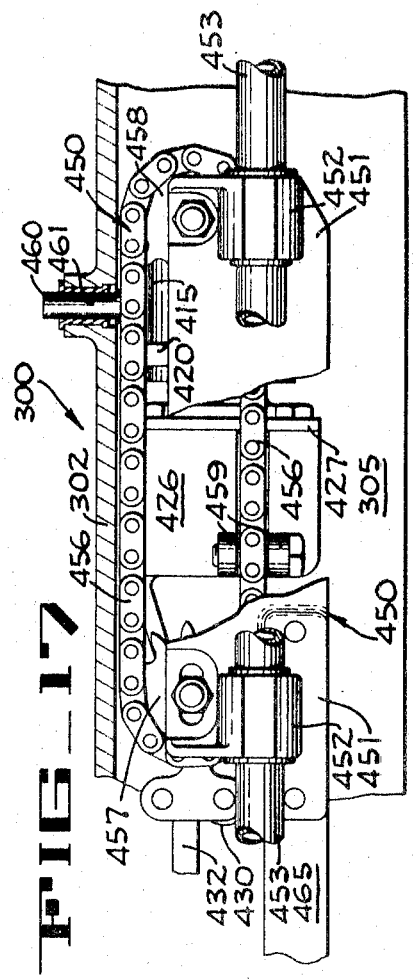
INVENTOR
LESLIE VADAS
BY *F. W. Anderson*
*C. E. Tripp*
ATTORNEYS

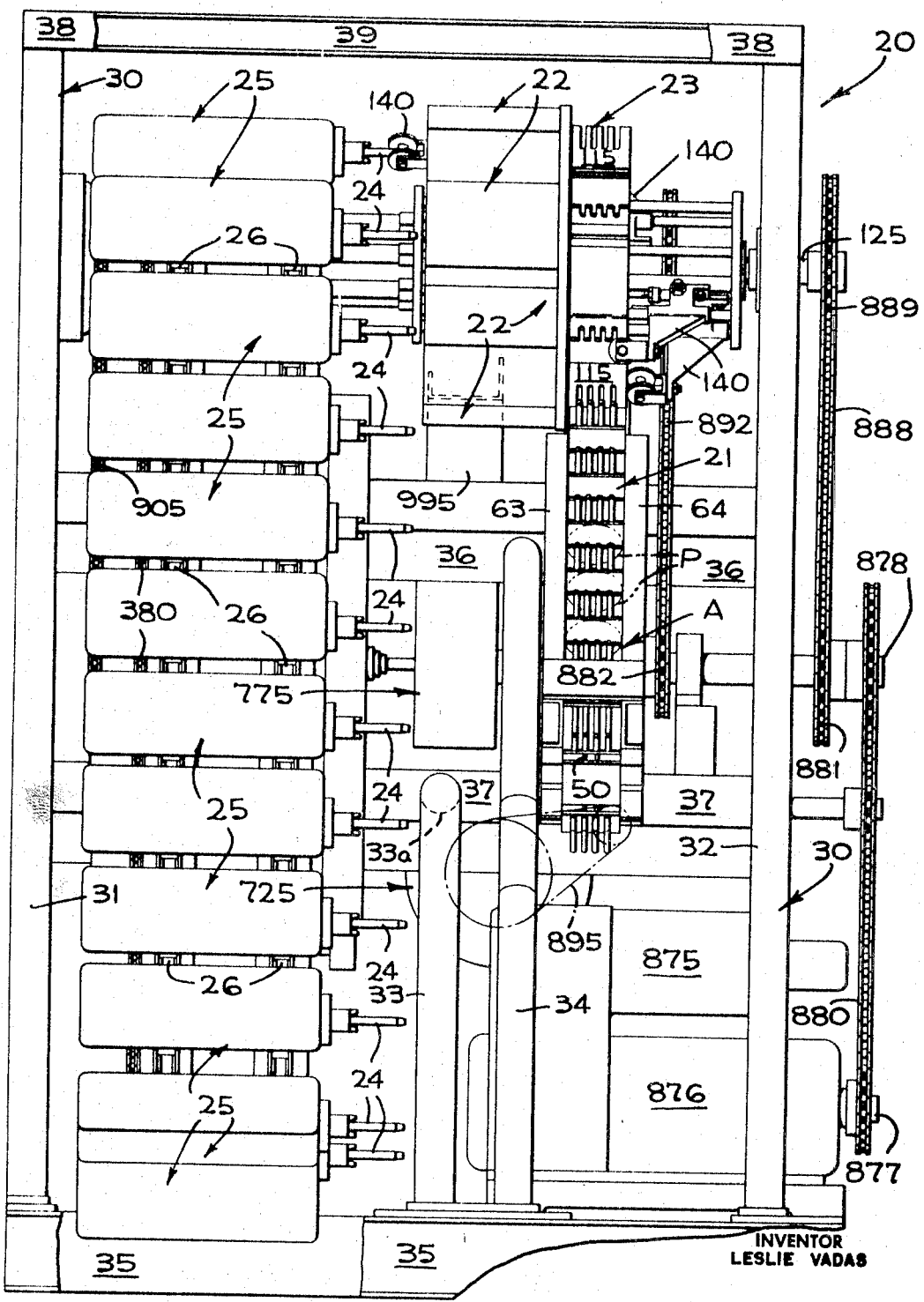
FIG_1

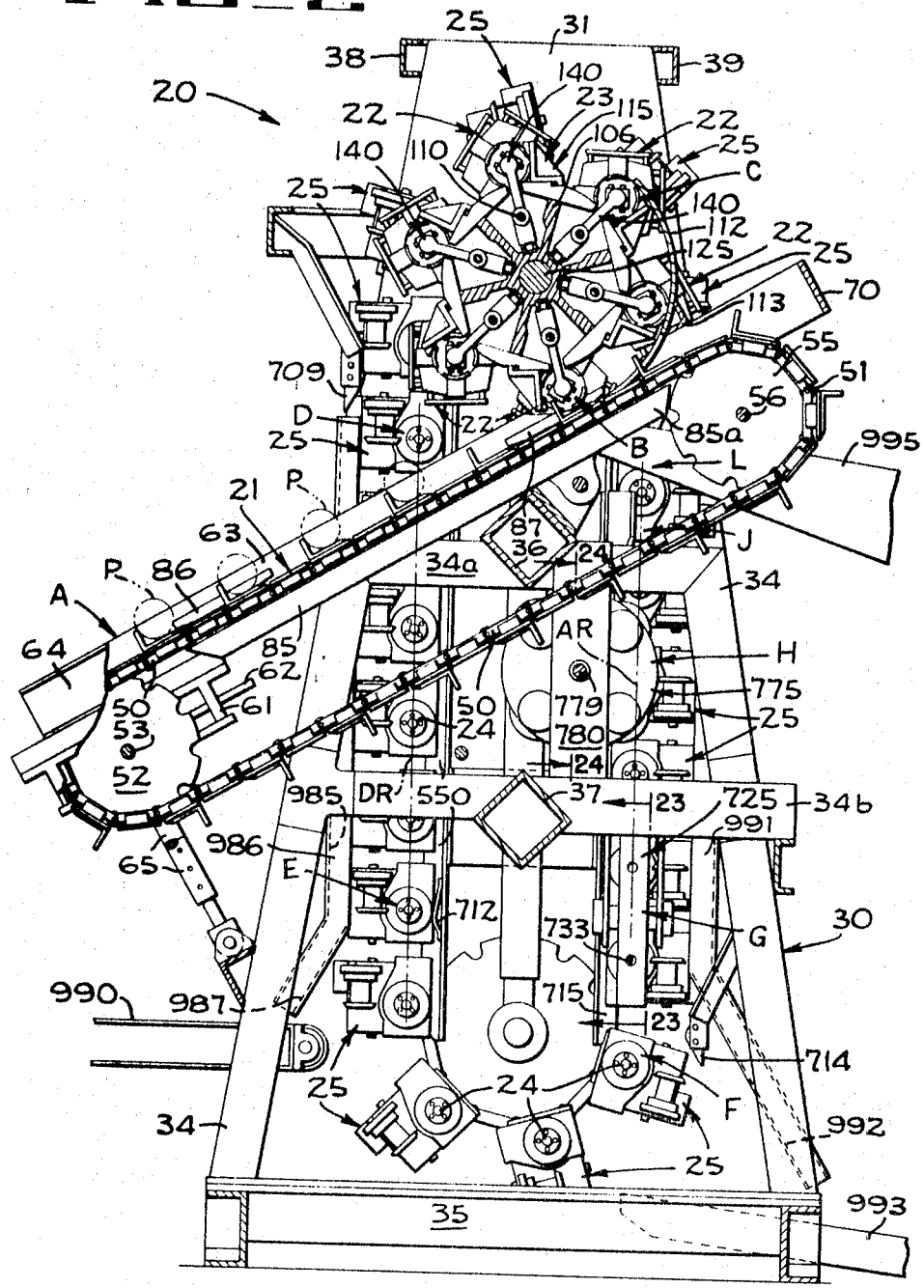

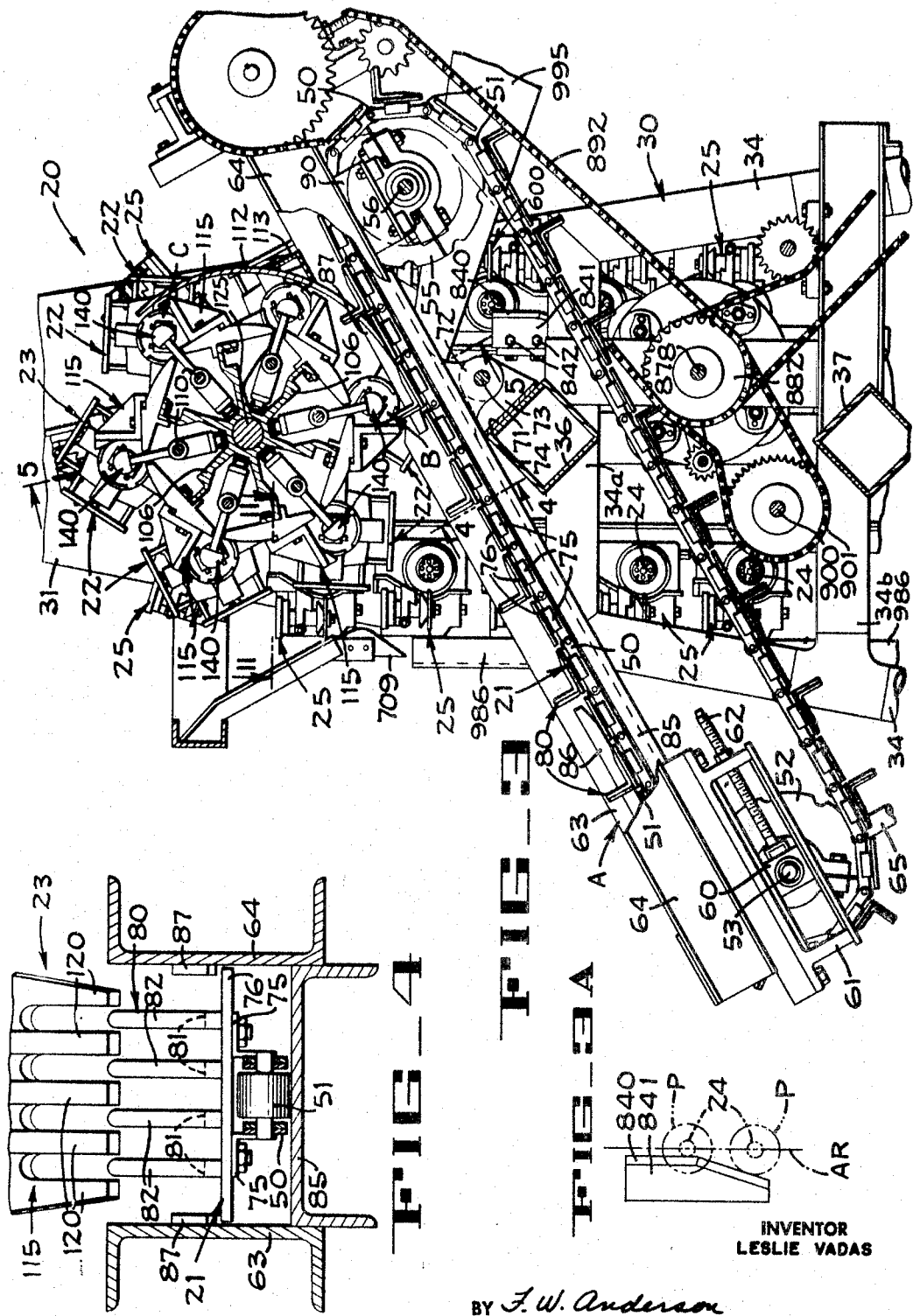

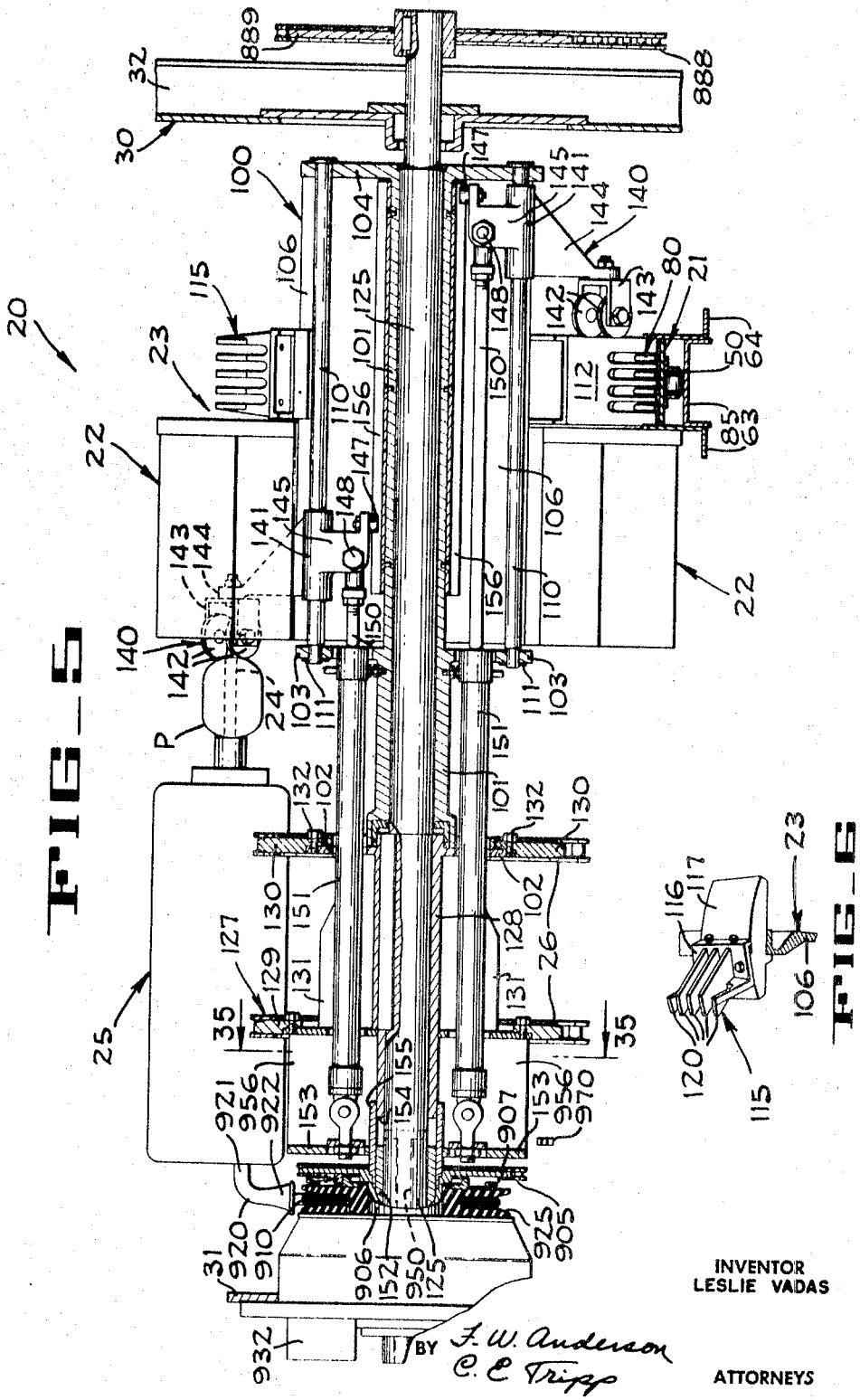

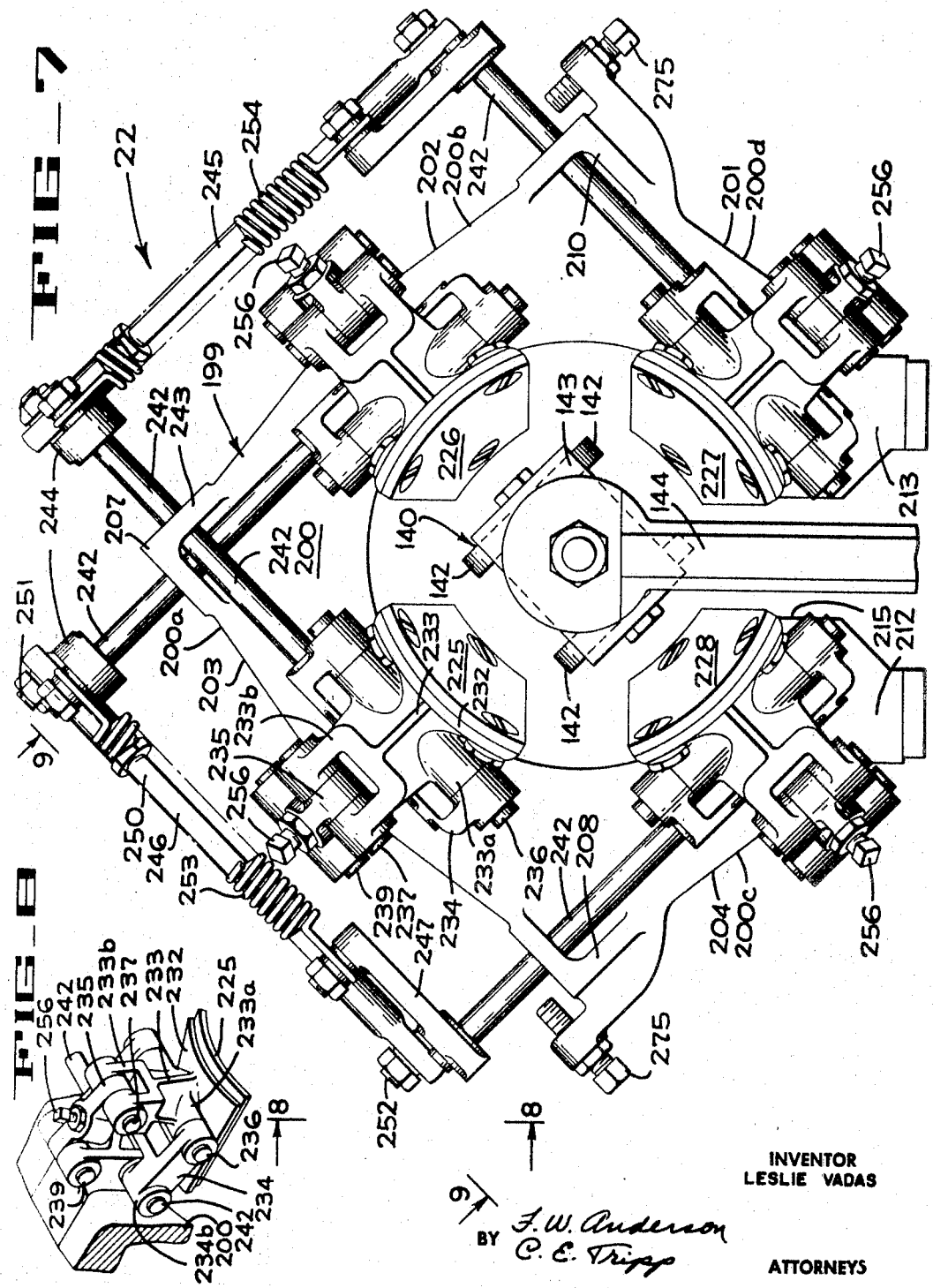

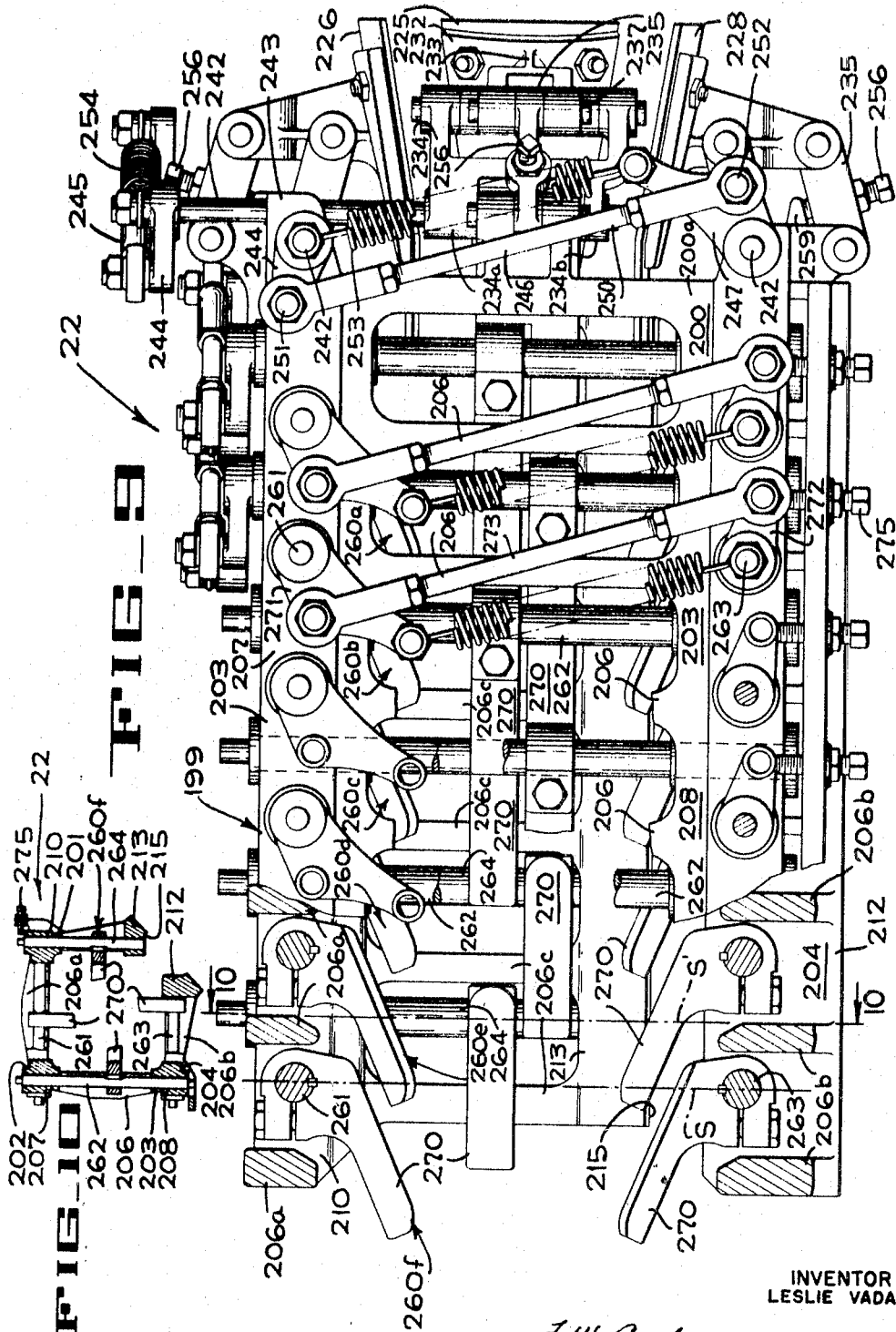

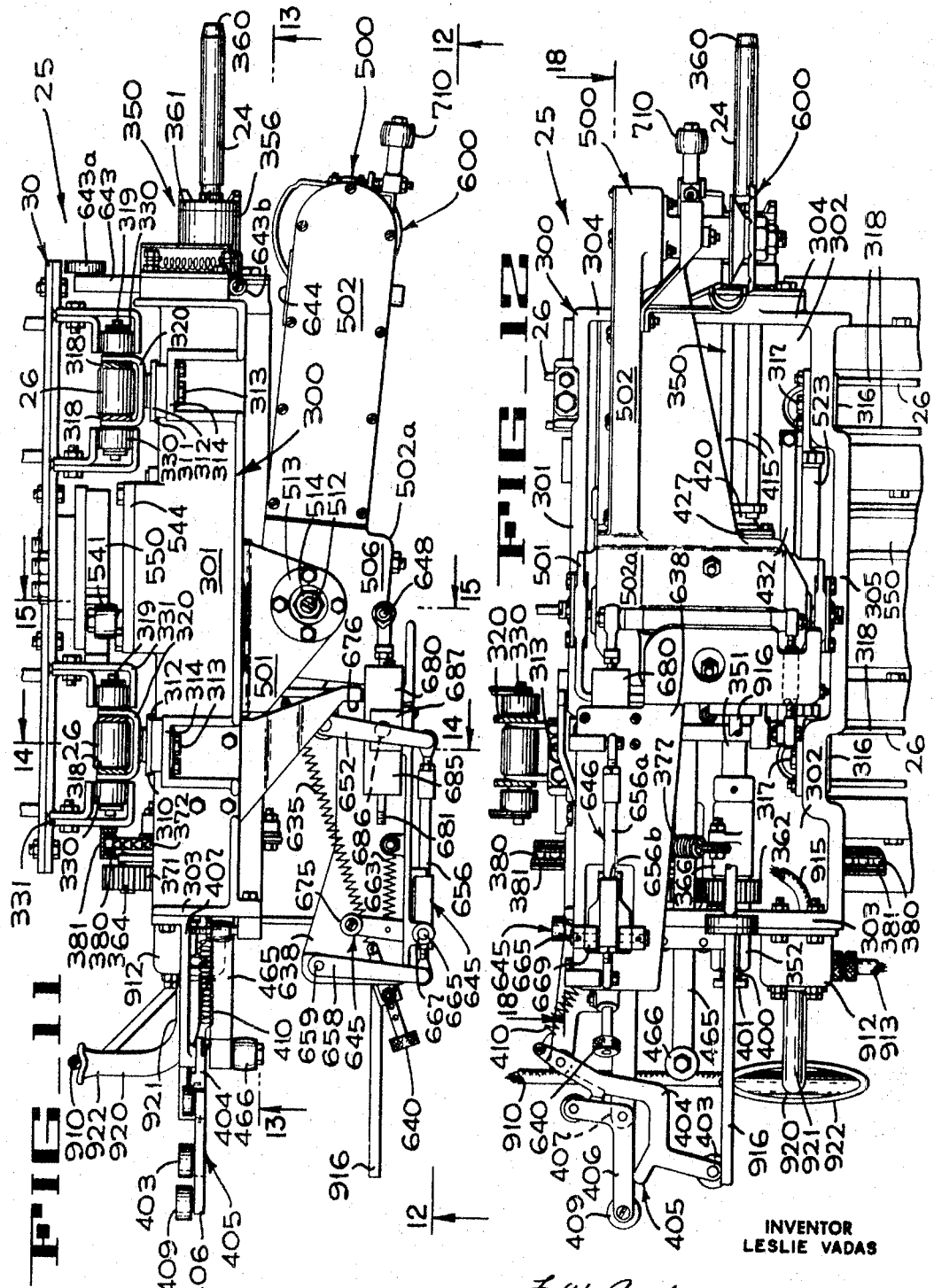

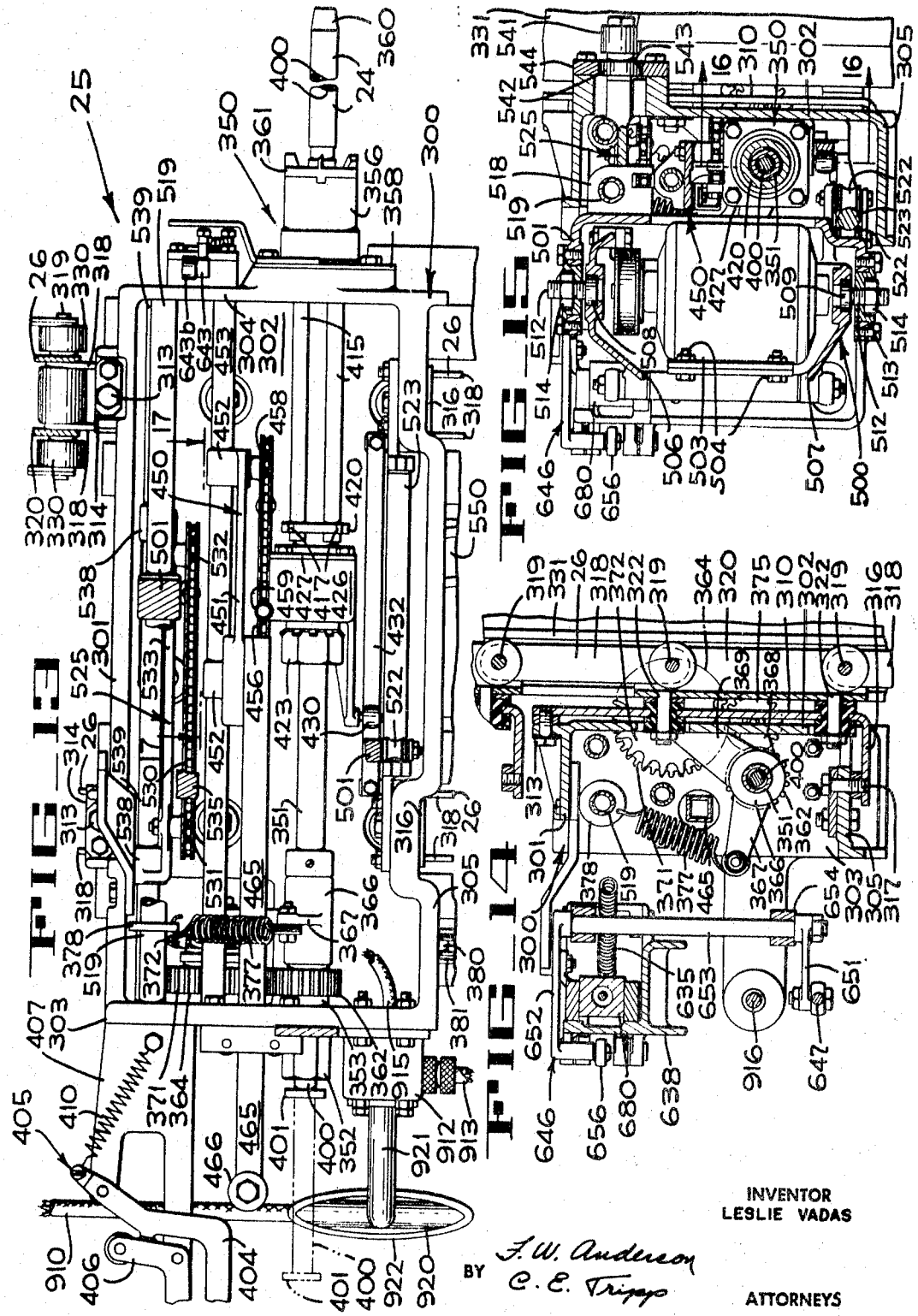

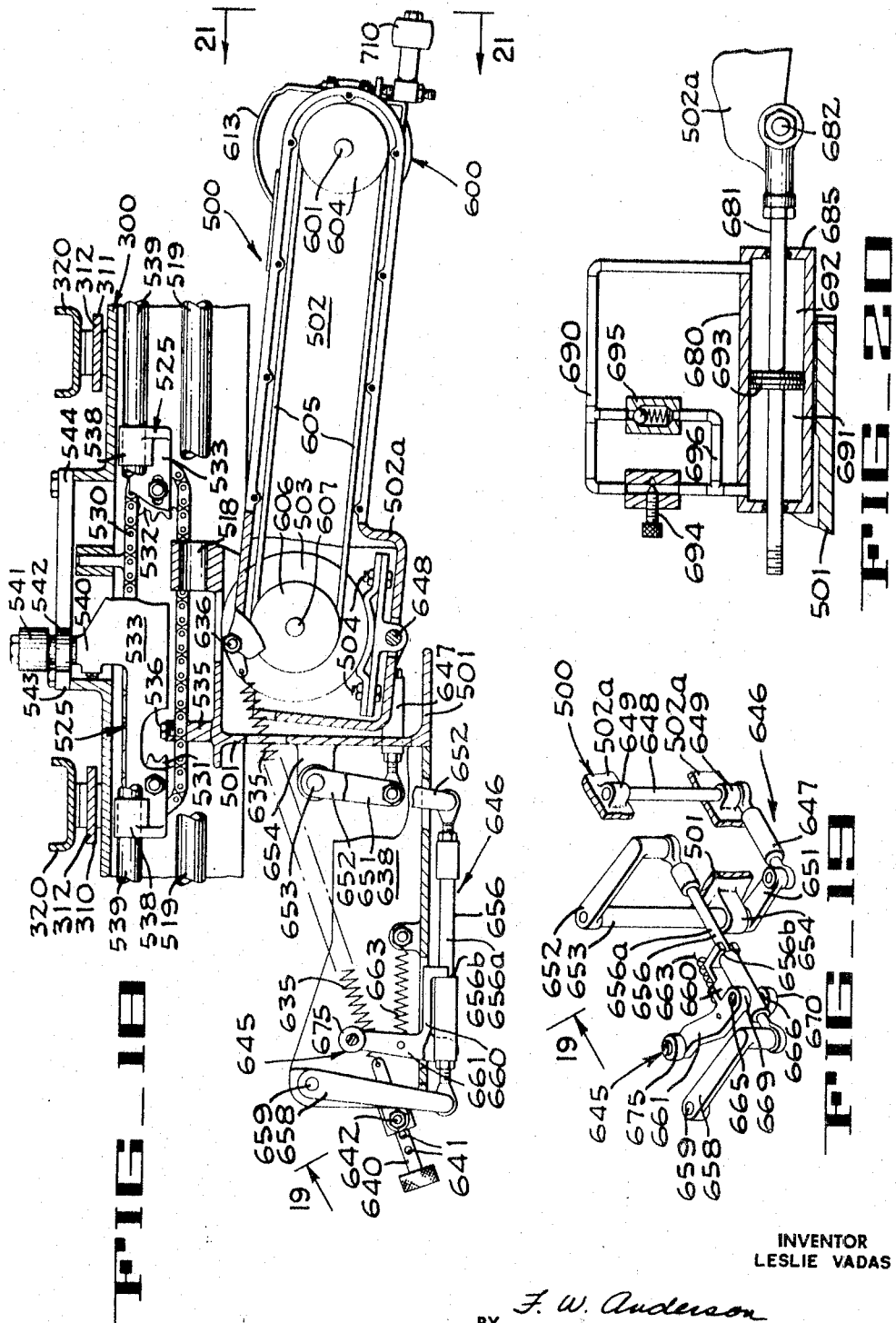

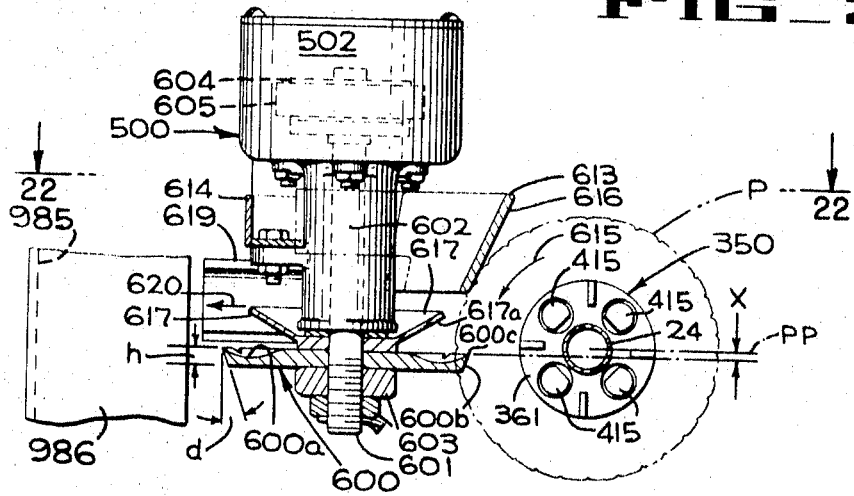
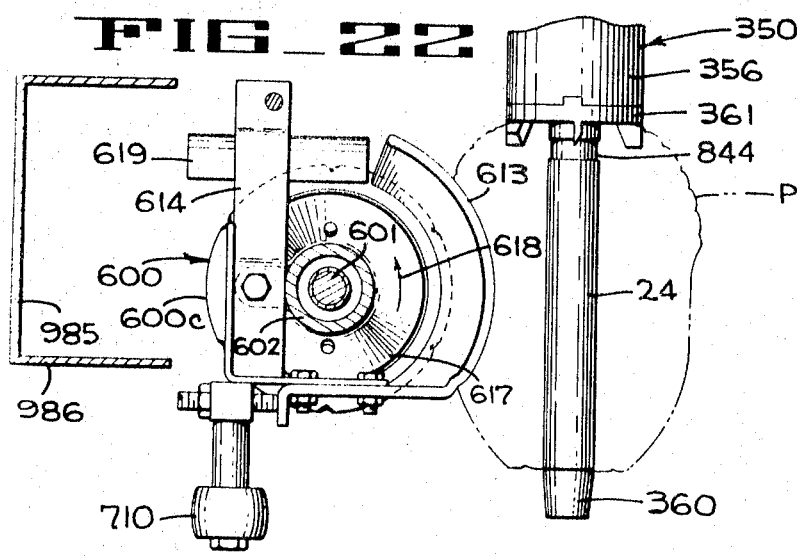

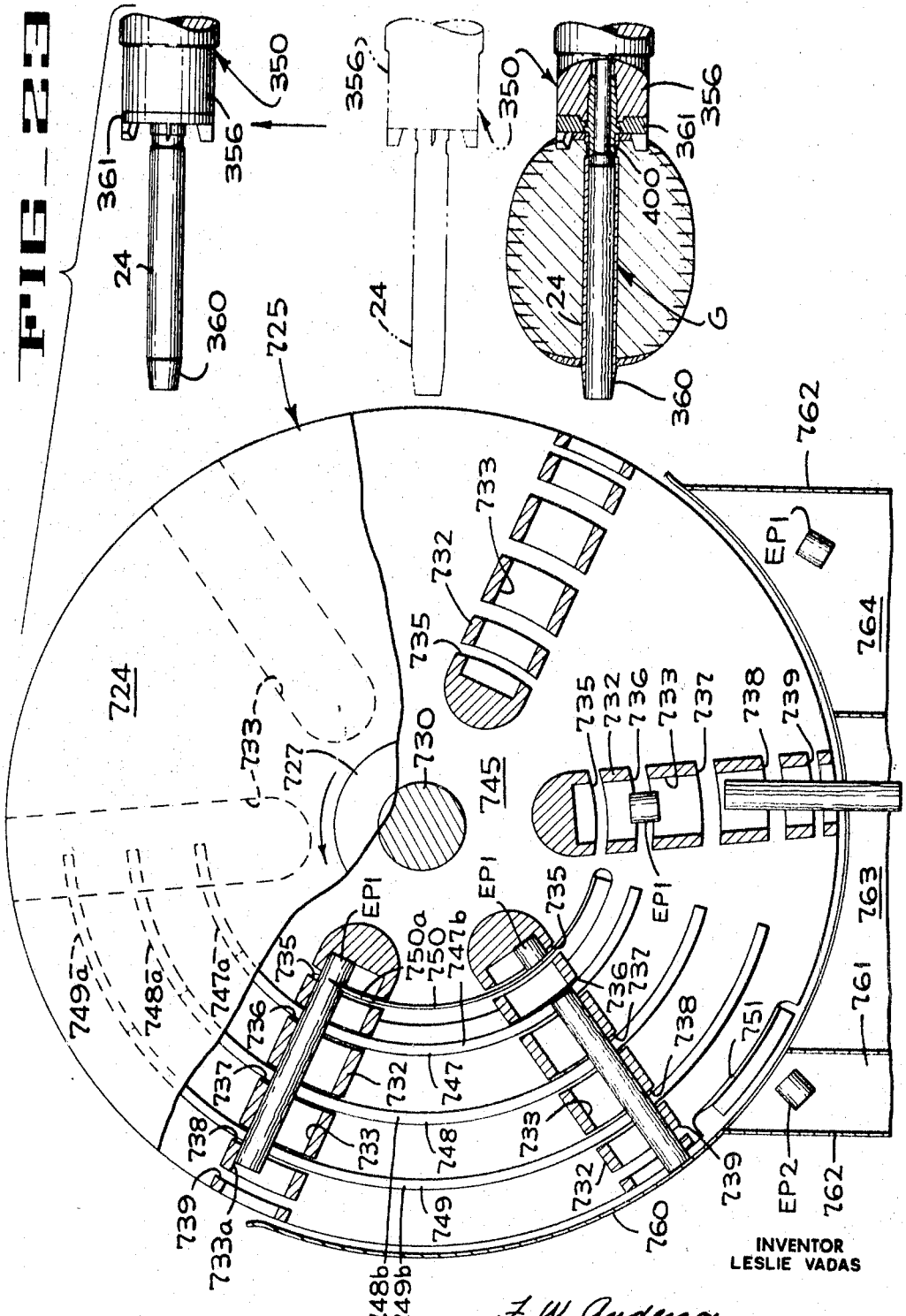

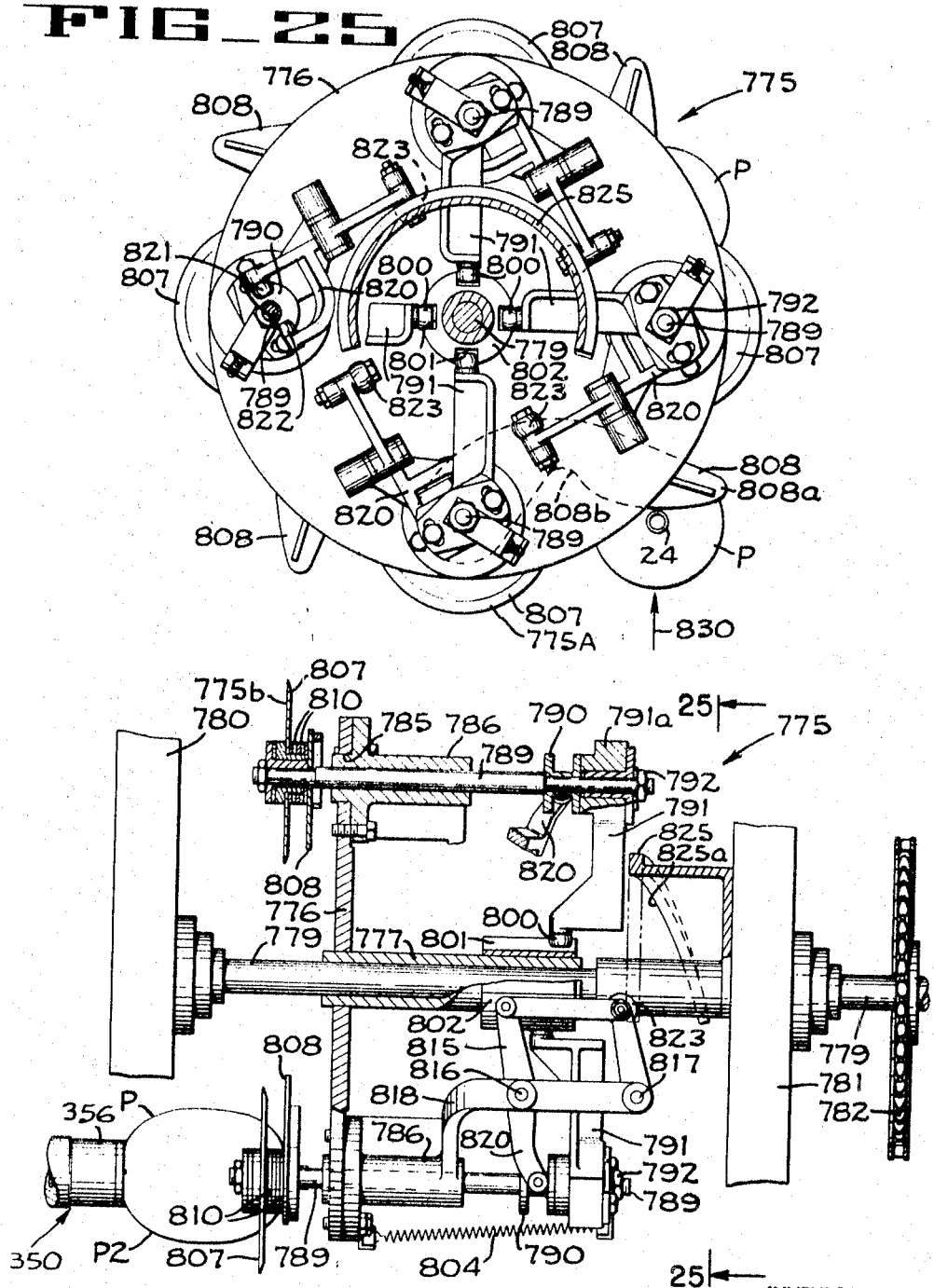

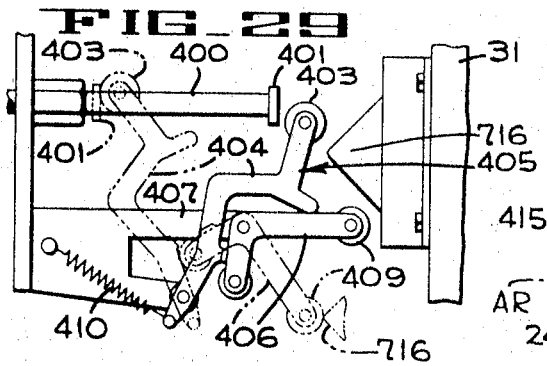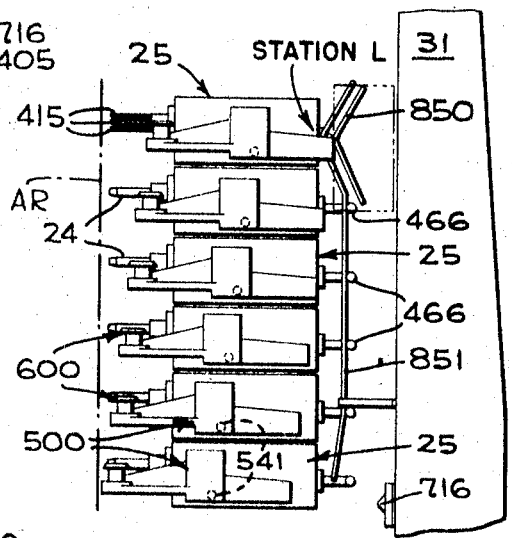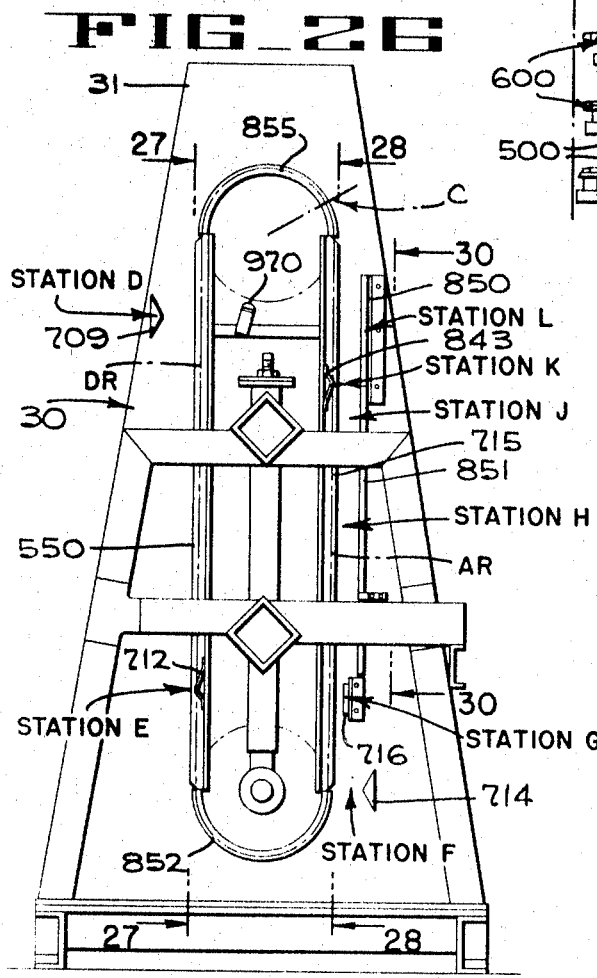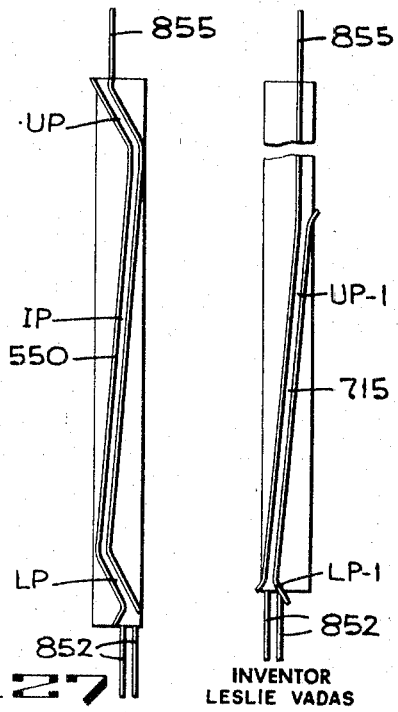

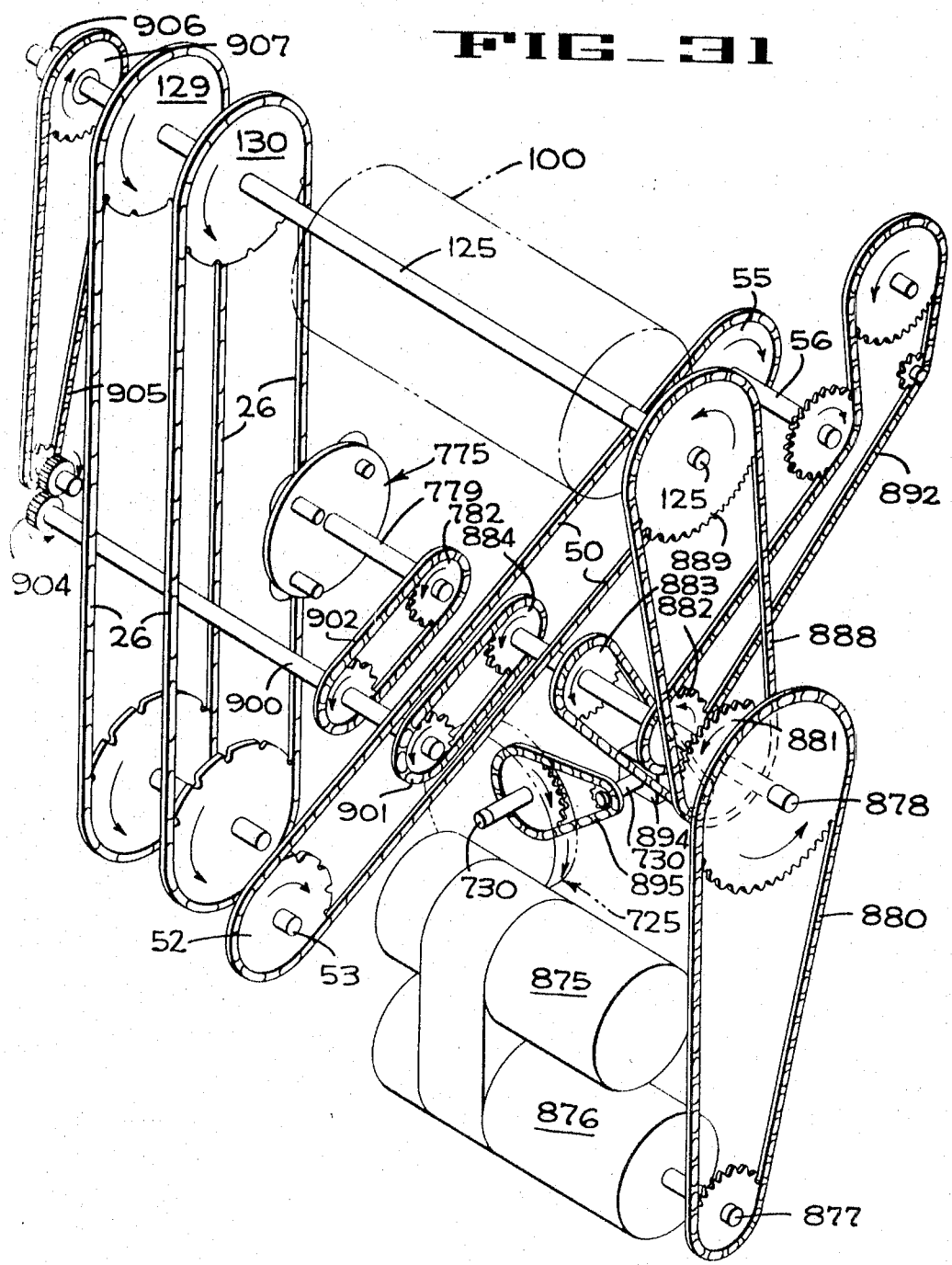

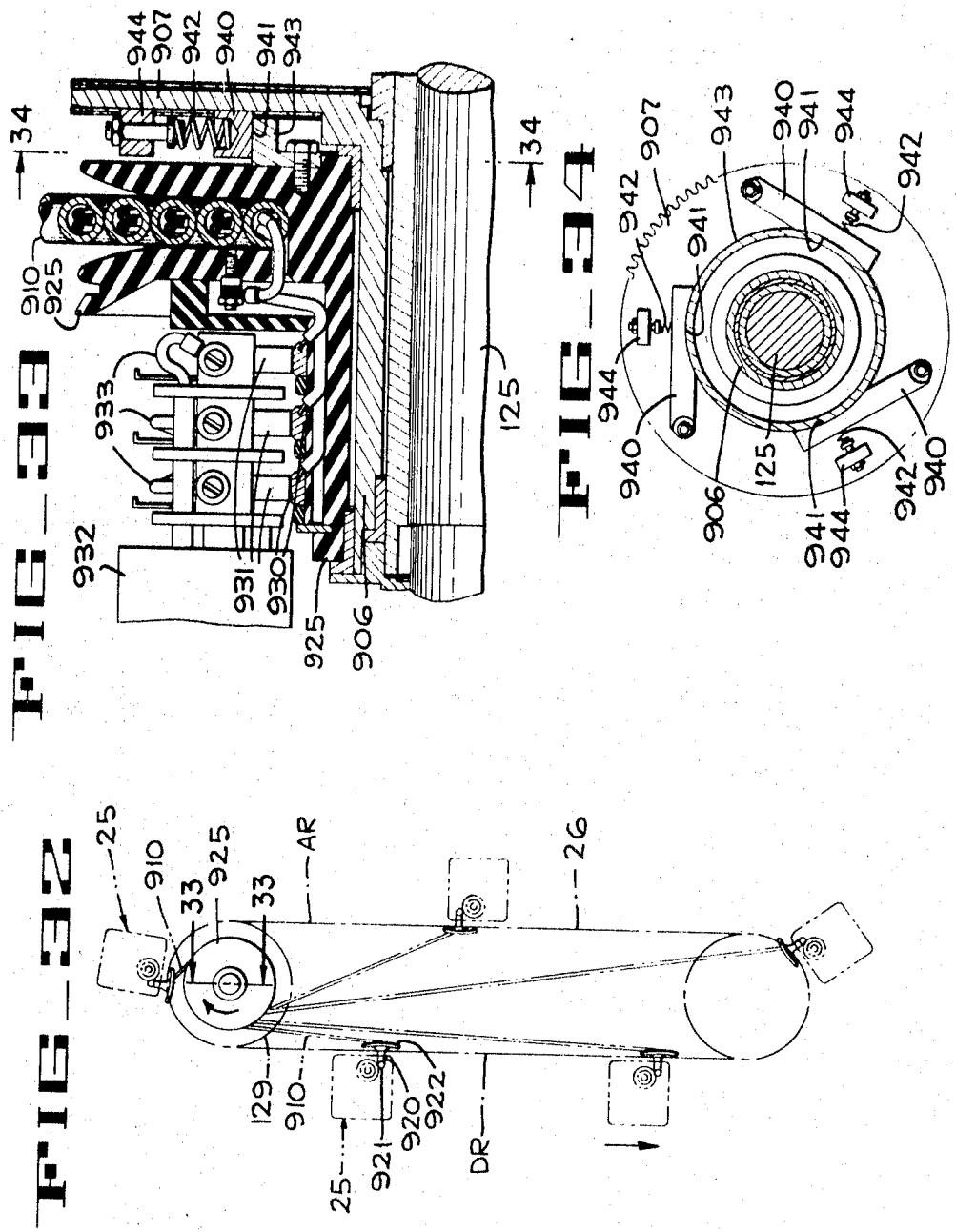

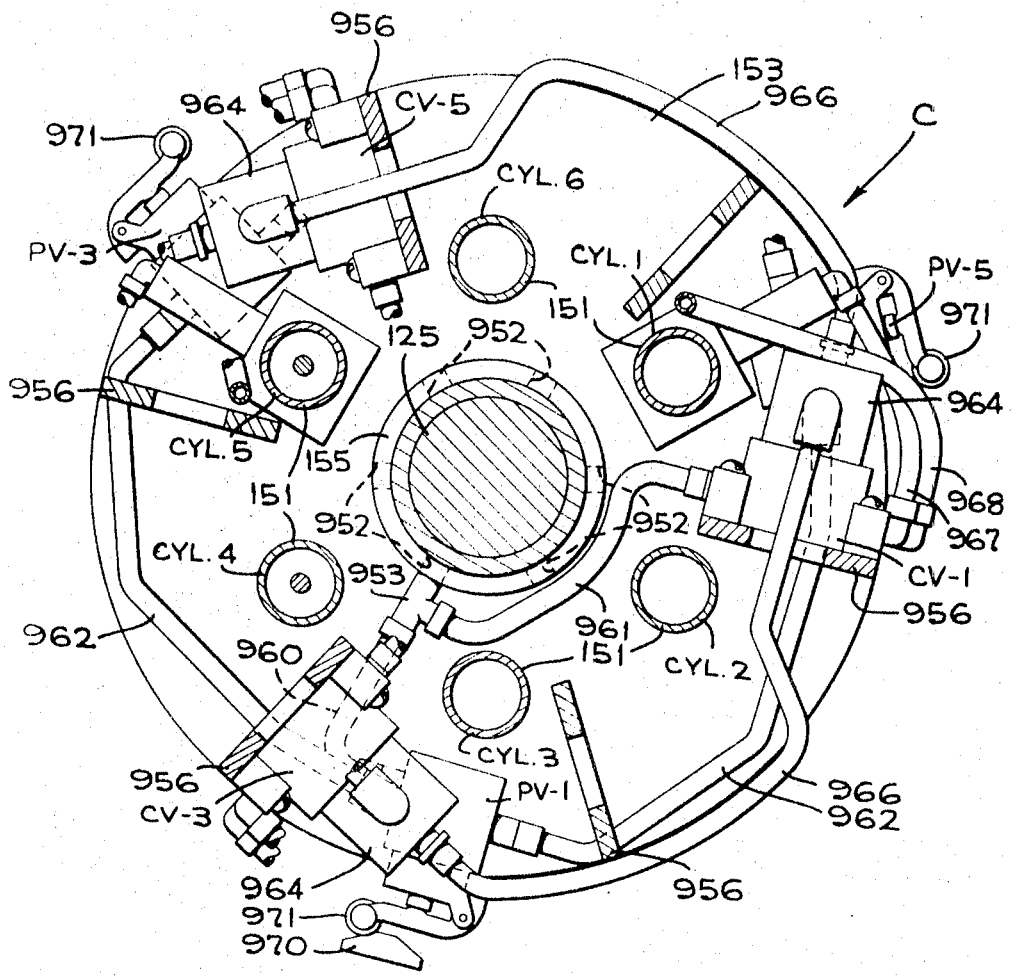

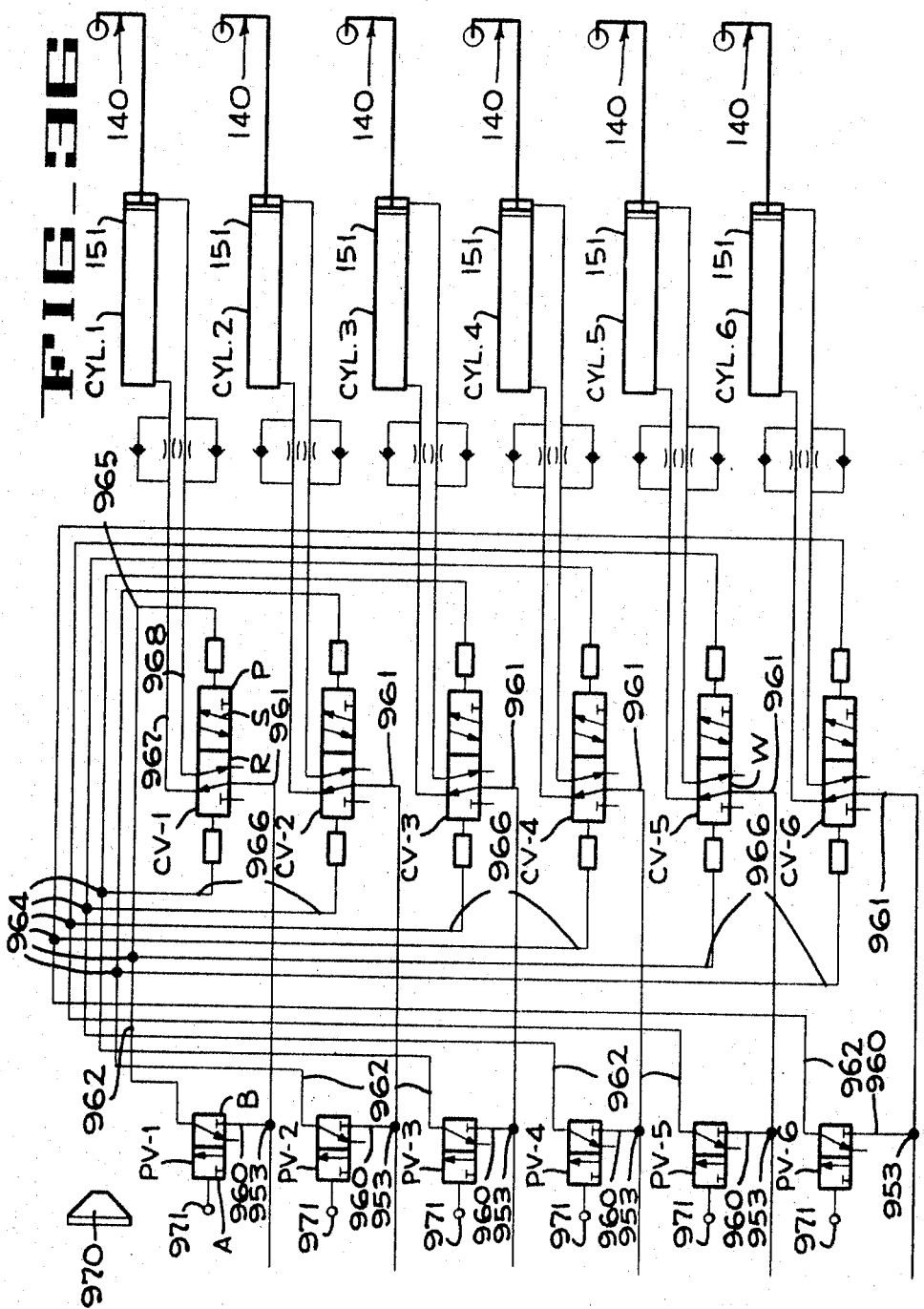

Aug. 12, 1969    L. VADAS    3,460,596
PINEAPPLE PEELING AND TRIMMING METHOD
Original Filed Nov. 27, 1964    20 Sheets-Sheet 19
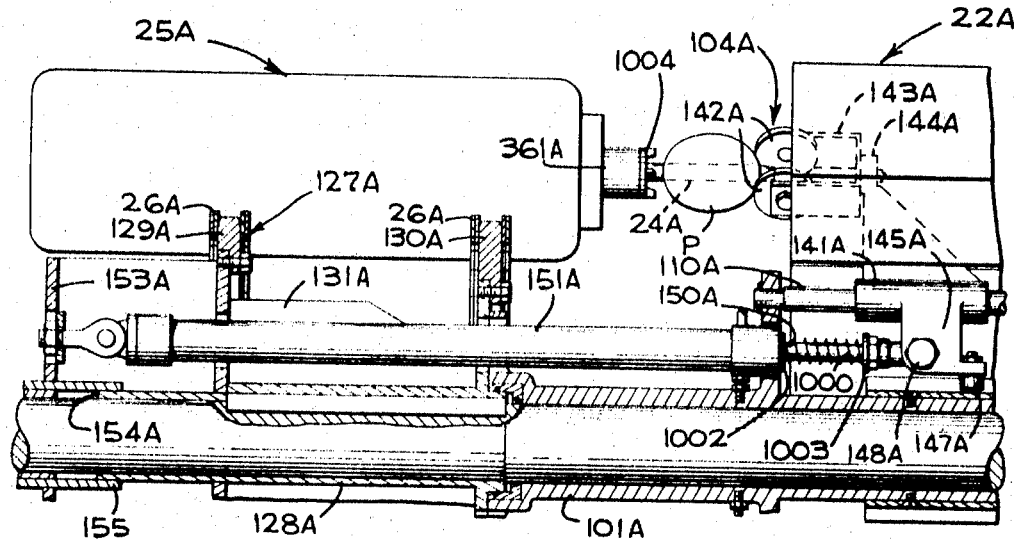
FIG_37
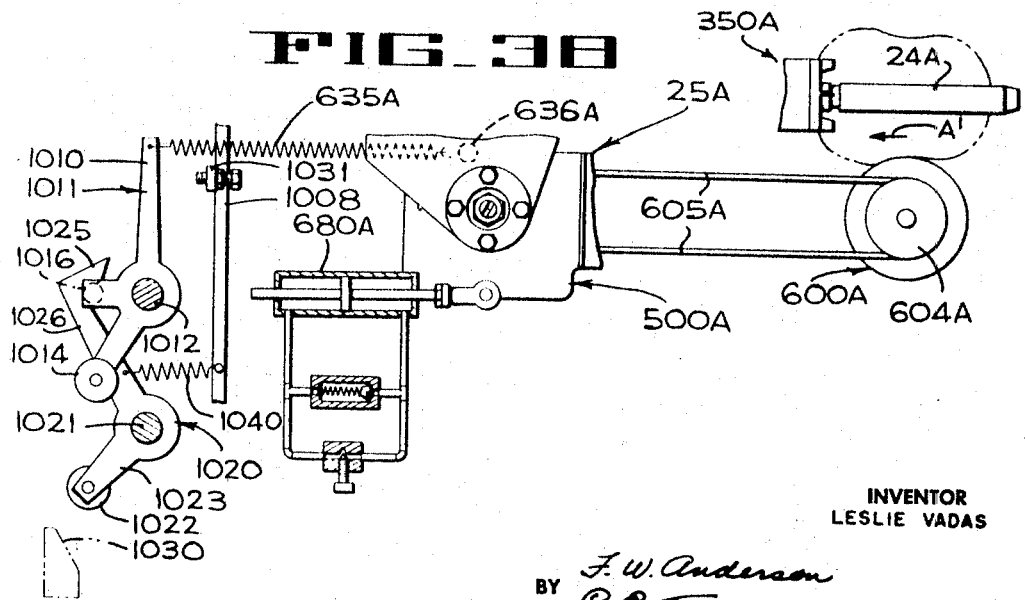
FIG_38
INVENTOR
LESLIE VADAS
BY F. W. Anderson
   C. C. Tripp
   ATTORNEYS

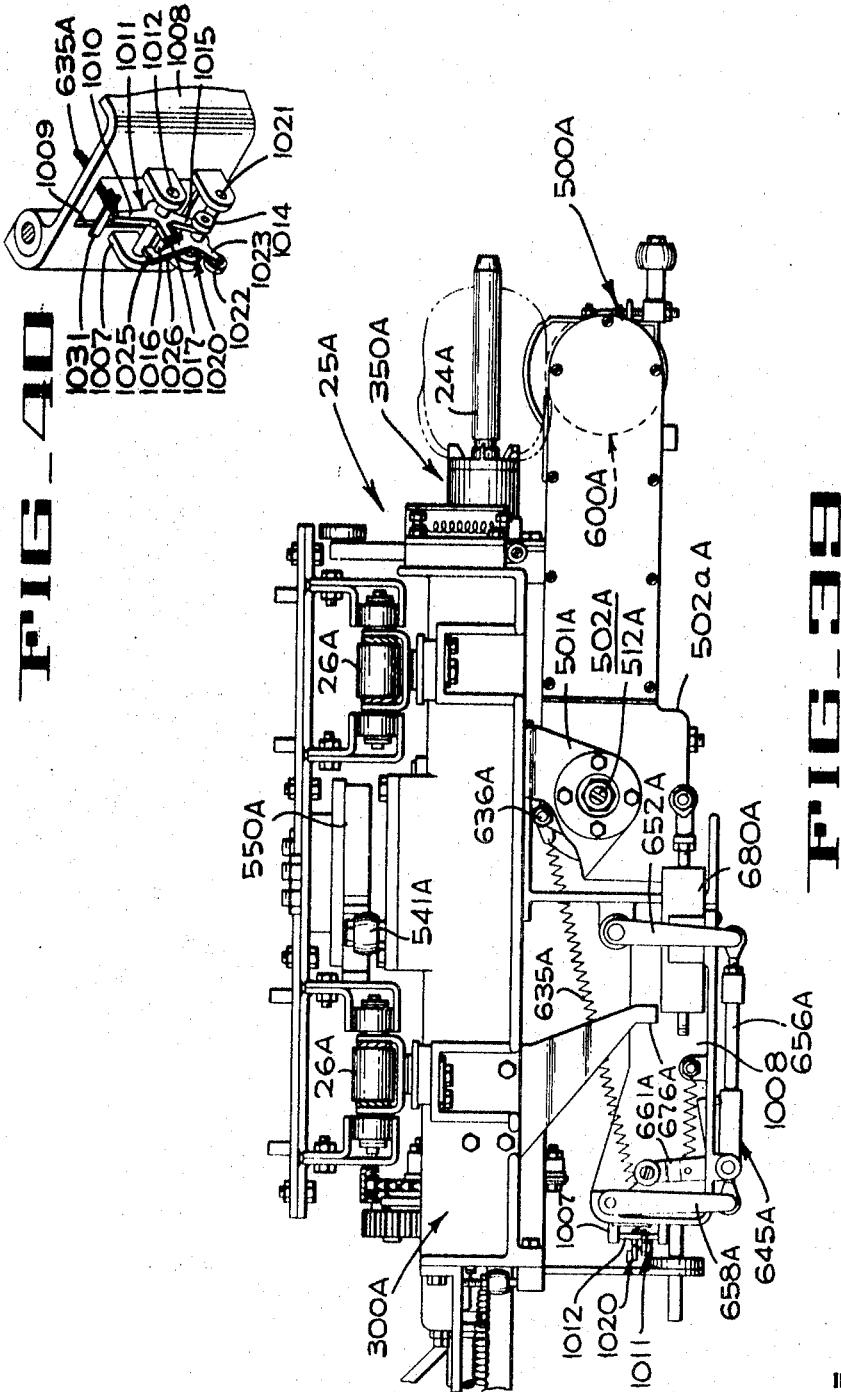

United States Patent Office 3,460,596
Patented Aug. 12, 1969

3,460,596
PINEAPPLE PEELING AND TRIMMING METHOD
Leslie Vadas, Los Gatos, Calif., assignor to FMC Corporation, San Jose, Calif., a corporation of Delaware
Original application Nov. 27, 1964, Ser. No. 414,121, now Patent No. 3,352,337, dated Nov. 14, 1967. Divided and this application Sept. 22, 1967, Ser. No. 704,959
Int. Cl. A47j 25/00
U.S. Cl. 146—238                              6 Claims

ABSTRACT OF THE DISCLOSURE

Pineapples are contour peeled in opposite directions while rotating about their axes. The pineapples are advanced across end trimming knives while supported at their core holes. The skin and flesh peelings are separately collected and the core is collected with the flesh.

---

This invention pertains to an improved method of processing pineapple. More particularly, the invention relates to a method for peeling, coring and trimming pineapples. This is a division of application Ser. No. 414,121, filed Nov. 27, 1964, now Patent 3,352,337, issued Nov. 14, 1967.

At present, the pineapple product that gives the processor the largest monetary return is sliced pineapple. Accordingly, it is desirable to obtain as many commercially acceptable slices as possible from each pineapple. It has been the usual practice heretofore to force each pineapple into a cylindrical cutter which divides the pineapple into a solid cylindrical inner member and an annular outer member. The inner member can be transversely cut to provide the desirable pineapple slices, however, the outer member contains the skin and it can be used only for juice, animal feed or, if the layer of flesh adjacent the skin is thick enough and special machinery is available, chunks of pineapple may be separated from the skin and used for crushed pineapple or the like which is slightly more desirable from an economic standpoint than the pineapple juice. However, in order to process pineapples on a production basis in a machine having the above mentioned cylindrical cutter it is necessary to choose a cutter that will be small enough to effectively cut the smallest pineapple being processed. Even when the pineapples are sized before being processed, a cutter must be selected that leaves an outer skin ring of considerable thickness when pineapples larger than the minimum size are processed. Accordingly, with this type of processing a considerable amount of the flesh, that could form part of large pineapple slices, must be recovered as lower-priced pineapple products due to the inherent inefficiency of the present pineapple processing machines.

Another disadvantage inherent in those machines using a cylindrical cutter results from the fact that the surface of a pineapple is formed of a plurality of adjacent sections, each of which has a stem-like member projecting inwardly toward the core of the pineapple. Since each stem projects inwardly approximately the same distance, the inner ends of the stems adjacent the opposite ends of the pineapple are much closer to the axis of the fruit than are the ends of the stems at the relatively large central portion of the fruit. The usual procedure is to cut off a portion of each end of the pineapple, and choose a cylindrical cutter that has a diameter less than the diameter of the circle defined by the inner ends of the stems at one cut end of the pineapple. With a cutter of this diameter, no objectionable "eyes" will be left in the surface of the solid cylindrical member cut out by the cutter. However, it is evident that, if the cutter is so chosen that it will just clear the inner ends of the stems at the cut end of the fruit, it will clear the ends of the stems at the central portion of the fruit by a large amount, and a large volume of unblemished pineapple flesh will remain at the central portion of the pineapple inwardly of the stem ends. This disadvantage is overcome in the present invention by providing a cutter that contour-peels the pineapple and cooperates with suitable gauge means so that the depth of cut is slightly greater than the depth to which the stems project into the pineapple. Accordingly, a maximum amount of unblemished fruit results from the contour-peeling mechanism of the present invention.

In accordance with the present invention, a machine is provided that is capable of the contour-peeling of pineapples, thereby removing an outer layer that need only be thick enough to include all of the skin and parts projecting inwardly from the skin into the flesh. The peeled fruit can then be trimmed to form a cylinder of maximum size for the production of sliced pineapple. Further, since the material trimmed from the cylinder is free from the skin, it is easily and efficiently converted for marketing as crushed pineapple. As a result, a maximum number of slices is obtained from each pineapple, and a maximum amount of the remainder is recovered as crushed pineapple. The amount of the pineapple recovered as juice and animal feed is kept at a minimum.

Accordingly, it is an object of the present invention to provide an improved method processing fruit, such as pineapples.

Another object is to provide a method for automatically contour-peeling, coring and end-trimming pineapples.

Another object is to provide for separately collecting different products resulting from the processing of pineapples.

Another object is to provide for trimming the end of a pineapple while supported at its core hole.

Other and further objects and advantages of the present invention will be apparent from the following description taken in connection with the accompanying drawings, in which:

FIGURE 1 is a fragmentary diagrammatic front elevation of the pineapple processing machine of the present invention.

FIGURE 2 is a fragmentary, more or less diagrammatic side elevation, with parts broken away and parts in section, of the machine of FIG. 1.

FIGURE 3 is a fragmentary enlarged side elevation, with parts broken away and parts in section of the upper portion of the machine of FIG. 2.

FIGURE 3A is a diagrammatic side elevtation of an end-trimming blade, particularly showing the relation of the blade and the path of movement of a pineapple.

FIGURE 4 is an enlarged vertical section taken along lines 4—4 of FIG. 3.

FIGURE 5 is an enlarged, partly diagrammatic vertical section, with parts in elevation, taken substantially along lines 5—5 of FIG. 3.

FIGURE 6 is an enlarged fragmentary perspective of a portion of the fruit pick-up turret of the machine, particularly showing the digitated construction of one of the pick-up members.

FIGURE 7 is an end elevation of one of the centering units used in the machine of the present invention.

FIGURE 8 is a reduced, fragmentary perspective of a portion of the centering unit of FIG. 7, the view being taken looking generally in the direction of arrows 8—8 of FIG. 7.

FIGURE 9 is a side elevation, with parts broken away and parts in section, of the centering unit of FIG. 7, the view being taken looking in the direction of arrows 9—9 of FIG. 7.

FIGURE 10 is a reduced transverse section taken along line 10—10 of FIG. 9.

FIGURE 11 is an enlarged horizontal section taken generally along lines 11—11 of FIG. 3 and particularly showing one of the twenty-two processing or peeling units of the machine.

FIGURE 12 is a side elevation of the head of FIG. 11, the view being taken looking in the direction of lines 12—12 of FIG. 11.

FIGURE 13 is a section taken along line 13—13 of FIG. 11.

FIGURE 14 is a transverse section taken along line 14—14 of FIG. 11.

FIGURE 15 is a transverse section taken along line 15—15 of FIG. 11.

FIGURE 16 is an enlarged, fragmentary section taken along line 16—16 of FIG. 15.

FIGURE 17 is an enlarged fragmentary section taken along line 17—17 of FIG. 13.

FIGURE 18 is a fragmentary section taken generally along line 18—18 of FIG. 12, with certain parts being shown in elevation.

FIGURE 19 is a perspective of the latching mechanism used in the processing unit, the view being taken looking generally in the direction of arrows 19—19 of FIG. 18.

FIGURE 20 is an enarged diagrammatic section of a dampening mechanism used with the cutter assembly on each processing unit.

FIGURE 21 is an enlarged section taken on line 21—21 of FIG. 18, and showing the details of a cutter and its mounting and its position relative to a pineapple positioned on a coring tube.

FIGURE 22 is a section taken along line 22—22 of FIG. 21.

FIGUE 23 is a vertical section taken along line 23—23 of FIG. 2.

FIGURE 24 is an enlarged fragmentary vertical section taken along line 24—24 of FIG. 2.

FIGURE 25 is a section taken along line 25—25 of FIG. 24.

FIGURE 26 is a diagrammatic side elevation of the machine, particularly showing the location of various cams and guide strips.

FIGURE 27 is a front elevation of one of the cam tracks used in the machine, the view being taken looking in the direction of arrows 27—27 of FIG. 26.

FIGURE 28 is a front elevation of another cam track, the view being taken looking in the direction of arrows 28—28 of FIG. 26.

FIGURE 29 is a side elevation of the core ejector control linkage and the cam that actuates it.

FIGURE 30 is a diagrammatic side elevation of a part of the machine, the view being taken looking in the direction of arrows 30—30 of FIG. 26.

FIGURE 31 is a diagrammatic perspective of the drive mechanism of the machine of FIG. 1.

FIGURE 32 is a diagrammatic side elevation of the mechanism mounted at the upper end of the machine for automatically unwinding and winding an electric cord on a rotating reel whereby the various processing units are supplied with electric power as they continuously move in an endless path.

FIGURE 33 is an enlarged fragmentary section taken generally along lines 33—33 of FIG. 32.

FIGURE 34 is a reduced section taken along lines 34—34 of FIG. 33.

FIGURE 35 is an enlarged fragmentary section taken along lines 35—35 of FIG. 5.

FIGURE 36 is a diagram of the air control system used in the machine of FIG. 1.

FIGURE 37 is a fragmentary sectional view particularly showing a second embodiment of the pineapple loading mechanism of the machine.

FIGURE 38 is a fragmentary schematic view of a second embodiment of the mechanism for urging the cutter into engagement with the fruit.

FIGURE 39 is a plan view of the mechanism of FIG. 38.

FIGURE 40 is a fragmentary perspective of a portion of the mechanism of FIG. 39.

In general the machine 20 comprises a continuously moving feed conveyor 21 (FIGS. 1 and 2) which has a feed station A (FIG. 2) at which pineapples P are received, said pineapples being manually positioned on the conveyor with their axes in a generally horizontal position. The pineapples are carried upwardly to a transfer station B where they are picked up by fingers of a transfer turret 23 that is driven in timed relation with the feed conveyor 21. The turret moves counter-clockwise (FIG. 2) and, at a second station C, each pineapple is moved horizontally through one of six centering units 22 that are mounted on the transfer turret 23. When the pineapple leaves the centering unit, it is moved onto a coring tube 24 (FIG. 1) which is carried by a peeling or processing unit 25. In the embodiment of the invention shown in FIGS. 1 and 2, twenty-two separate processing units 25 are used, and all of these units are mounted in equispaced relation on two spaced endless chains 26, which form a processing conveyor, so that the units move in an endless path having an ascending run AR (FIG. 2) and a descending run DR. The units 25 move in timed relation to the movement of the centering units 22 on turret 23 and to the movement of the feed conveyor 21 and, as will be explained more fully presently, the drive arrangement is such that, when each processing unit 25 reaches station C in the ascending run AR of the conveying chains 26, each coring tube moves into alignment with a centering unit 22 so that a pineapple in the centering unit can be transferred to the coring tube during continuous, synchronized movement of the feed conveyor, the transfer turret, and the processing conveyor.

While a pineapple is carried in impaled condition on the coring tube, various mechanisms of the associated processing unit are effective to remove and separately collect the peel of the pineapple, cut off the ends of the pineapple, remove the core, and finally discharge the cored, peeled and trimmed pineapple in the ascending run AR of the processing conveyor at a discharge station L.

The machine 20 includes a rigid support structure 30 including vertical end frames 31 and 32 (FIG. 1) and vertically disposed intermediate frames 33 and 34, all mounted on a common base 35. In one embodiment of the machine, each end frame 31 and 32 is approximately eleven feet tall and the distance between the end frames is about six and a half feet. The intermediate frame 34 is an A-shaped member (FIG. 2) that has transverse members 34a and 34b welded to and supporting longitudinal box beams 36 and 37, while the intermediate frame 33 has a single transverse member 33a welded to the box beam 37. The upper ends of the end frames 31 and 32 are connected by longitudinal plates 38 and 39 (FIG. 2).

Feed conveyor.—The feed conveyor 21 comprises an endless chain 50 (FIGS. 3 and 4) that has rollers 51 adapted to be engaged by the teeth of an idler sprocket 52 carried by a shaft 53 and by a drive sprocket 55 that is keyed to a power driven shaft 56. Shaft 53 is mounted in a pair of bearing blocks 60 (one only being shown) each of which is arranged to be slidably adjusted in a fixed frame 61 by means of an adjusting screw 62 in a conventional manner. The frame 61 includes two upstanding side plates 63 and 64 (FIG. 4) and is supported near its lower end on two pivotally mounted adjustable posts 65 (FIG. 2). Near the upper end of the frame 61, the two side plates 63 and 64 are connected by a transverse plate 70 and, at a point intermediate its ends, each side plate is supported by a transverse rod 71 (FIG. 3) that engages an arm 72 projecting downwardly from the side plate and an arm 73 carried by a bracket 74 that is welded to the box beam 36.

Each link of the endless chain 50 (FIG. 4) carries two angle brackets 75, and a flat rectangular plate 76 is secured across the upper surfaces of the brackets 75. Four pusher members 80 are welded in spaced relation on the upper surface of alternate support plates 76 to provide a pocketed carrier, each pusher member having a base 81 secured to the plate 76 and a finger 82 that projects at a right angle to the base 81. The upper run of the feed conveyor is supported by means of a support plate 85 (FIGS. 3 and 4) that is welded between the inner, opposed surfaces of the side plates 63 and 64 and has an upper end 85a adjacent sprocket 55. Holddown bars 86 and 87 (FIG. 4) are secured to the inner surface of each of the side plates, the bars 87 being mounted at the transfer station B to particularly prevent the chain from raising at this zone. A bracket 90 (FIG. 3) is secured to and projects downwardly from each of the side plates 63 and 64 to support bearing units in which the shaft 56 is disposed.

Transfer turret.—The transfer turret 23 comprises a reel 100 (FIG. 5) which includes a central tubular core 101 having three axially spaced, radially projecting discs 102, 103 and 104 formed thereon. Six equi-spaced radial flanges 106, which extend between discs 103 and 104 project outwardly from the core 101, being integrally formed with the core and the discs. Six guide rods 110 (FIG. 3) are fastened between the discs 103 and 104, each rod having an enlarged head abutting disc 104 (FIG. 5) and a reduced end adjacent disc 103 that receives a spring clip 111.

It will be noted in FIG. 3 that the upper end of the endless chain feed conveyor 21 passes under the transfer turret 23 and that each pineapple is carried toward the transfer station B in a pocket defined by a set of the pusher members 80. It is a feature of the present machine that, at transfer station B, fingers of six pick-up units 115 on the transfer turret which move somewhat faster than the fingers 82 of the feed conveyor, pass between said fingers 82 to engage the pineapple in the pocket, push it out of the pocket and upwardly along a curved guide plate 112. The plate 112 is supported from the side walls 63 and 64 of the feed conveyor by a bracket 113 and is formed on a circular arc which has the axis of revolution of the turret as its center.

As seen in FIG. 6, each pick-up unit 115 includes a base plate 116 bolted to a mounting plate 117 that is, in turn, bolted to the upper end of one of the six radial flanges 106. Five spaced fingers 120 are integrally formed on the base plate 116 and, referring to FIG. 4, it will be noted that the fingers 120 are so spaced relative to each other and to the fingers 82 of the feed conveyor that, as the fingers 120 approach transfer station B, they move down toward and into interdigitated relation with the fingers 82.

The reel 100 is disposed on a shaft 125 (FIG. 5) which is rotatably journalled in bearings in the end frames 31 and 32. Near the left hand end (FIG. 5) of shaft 125, a drive unit 127 is keyed to the shaft, said unit including a central sleeve 128 surrounding shaft 125 and two spaced sprockets 129 and 130 that are rigidly secured, as by welding and by the use of stiffening plates 131, to the sleeve 128. The drive unit 127 is keyed to shaft 125 and when the shaft 125 is driven, the unit 127 is also driven and it, in turn, drives the transfer turret reel 100 due to the fact that the disc 102 of the reel is secured to the large sprocket 130 by belts 132.

After a pineapple has been engaged by a set of pick-up fingers 120 and moved upwardly along the curved plate 112 to station C, it is moved in a horizontal direction to the left in FIG. 5, into one of the centering units 22 by means of one of six pusher units 140 that are mounted on the turret 100. Each unit 140 comprises a tubular center member 141 that is slidably supported on one of the fixed rods 110. Two pineapple-contacting rollers 142 are rotatably mounted on a bracket 143 that is secured to the end of a support arm 144 carried by and projecting from the center member 141 radially of the turret axis. A second arm 145 projecting from the center member 141 carries a rotatable guide roller 147 and is pivotally connected at 148 to the piston rod 150 of a double-acting power cylinder 151. Each power cylinder passes through holes in the disc 103 of the turret and through holes in the sprockets 129 and 130 and is pivotally connected to a disc 153 that is secured to an extension of the central sleeve 128 of the drive unit 127. The sleeve extension includes a sleeve 152 that is spaced from the end of sleeve 128 to form an annular chamber 154, and a large diameter sleeve 155 that is welded to the sleeve 128 and 152 and encloses chamber 154. Each guide roller 147 is disposed in a guide channel 156 which is secured to the outer surface of the central core 101 of the turret. Movement of each guide roller 147 in its associated channel maintains the radial orientation of the pusher unit relative to the axis of the turret. Also, it will be noted that each pusher unit is disposed immediately in front of one of the pick-up finger units 115 so that, when the pusher is activated, it is in position to engage the pineapple being carried around the turret by the pick-up unit.

Centering units.—Each of the centering units 22, which are shown diagrammatically in FIG. 1 as blocks, has a one-piece open framework housing 199 (FIGS. 7 and 9), which has an end wall 200 and four side walls 201–204. The side walls 202 and 203 are substantially identical and, as seen in FIG. 9, the side wall 203 comprises one edge portion 200a of the end wall 200 and six spaced, transverse bars 206 (four only being shown) connected between two longitudinal bars 207 and 208. The side wall 202 comprises one edge portion 200b of the end wall 200 and six transverse bars 206a (three only being shown in FIG. 9), that are identical to the transverse bars 206, and are connected between the longitudinal bar 207 and a longitudinal bar 210 that is identical to bar 208. The side walls 201 and 204 are similar in construction to the walls 202 and 203 but are not as wide. Accordingly, wall 204 comprises one edge portion 200c of end wall 200 and six spaced bars 206b, similar to transverse bars 206, that are connected between the longitudinal bar 208 and a bar 212; and side wall 201 is made up of the edge portion 200d of the end wall 200 and six bars 206c (FIG. 9) connected between a longitudinal bar 213 and the bar 210. Since the walls 201 and 204 are not as wide as the walls 202 and 203, a passage 215 is formed between the bars 212 and 213 through which one of the pineapple pusher units 140 passes as it moves a pineapple into the centering unit.

Four arcuate guide plates 225–228 (FIG. 7) are mounted at the entrance end of the centering unit. All of the guide plates are mounted on the housing in the same way so that a description of the mounting of the plate 225 will serve to disclose the mounting of all four plates. The plate 225 is an arcuate member that is bolted to a mounting base 232 (FIG. 8) which has a rearwardly extending flange 233 on which is formed a tubular transverse section 233a and a bifurcated end 233b. A pair of pivot members 234 and 235 are connected to the flange 233, the member 234 having two tubular hubs in alignment with the tubular transverse section 233a to receive a pivot shaft 236, and the member 235 having one end pivotally mounted in the bifurcated end 233b of the flange 233 by a pin 237, and an opposite end pivotally mounted on the end wall of the housing by means of a pin 239 that extends through two aligned tubular bosses formed on the end wall 200 of the housing 199. The pivot member 234 also has two aligned bosses 234a and 234b (FIG. 9) that are keyed to an actuator shaft 242 that is rotatably journalled in a boss 243 of the end wall 200 and has a lever 244 keyed to its end. It will be noted in FIG. 8 that, since the distance between pivot pins 237 and 239 is equal to the distance between the pin 236 and shaft 242, each guide plate is mounted on a parallelogram linkage for substantially straight line movement relative to the centerline of the housing.

The shaft 242 (FIG. 7) on which guide plate 225 is mounted is connected by a linkage 245 to the shaft 242 on which the guide plate 227 is mounted so that when either of these plates is moved, the other is also moved. Similarly, guide plates 226 and 228 are interconnected by a linkage 246. Since the linkages 245 and 246 are identical, only linkage 246 will be described in detail.

It will be noted in FIG. 9 that the lever 244 connected to the actuator shaft 242 of guide plate 226 is different in design than the lever 247 that is keyed to the actuator shaft 242 associated with the guide plate 228. Accordingly, a connecting link 250 may be pivotally connected to the two levers 244 and 247 by pivot bolts 251 and 252, respectively, so that, when guide plate 226 is moved away from the centerline of the housing 199, the guide plate 228 will also move away from the centerline of the housing. A spring 253 is connected between the shaft 242 of plate 226 and the lever 247 in a manner to continuously urge the two opposed guide plates 226 and 228 inwardly toward the centerline of the housing.

The two opposed guide plates 225 and 227 are pivotally mounted at the entrance end of the housing in exactly the same manner as are the plates 226 and 228 and they are urged inwardly by a spring 254, associated with linkage 245, the spring rates of springs 253 and 254 being chosen so that all four guide plates 225–228 are urged inwardly with substantially the same force. A stop-screw 256 (FIG. 9) is threaded into each pivot member 235 of the guide plate mountings for abutment with a fixed tab 259 on the housing to limit the inward pivoting movement of the plates 225–228.

Six centering finger assemblies 260a–260f (FIG. 9) are mounted inside the housing 199 so that, after the pineapple is initially centered by the four guide plates 225–228 and has entered the housing, it is maintained in centered position. These six centering finger assemblies are identical and accordingly, only the endmost assembly 260f will be described. The centering finger assembly 260f comprises four shafts 261–264 (FIG. 10), shaft 261 being rotatably journalled in the longitudinal bars 207 and 210 of the housing; shaft 262 being rotatably journalled in bars 207 and 208; shaft 263 being rotatably journalled in bars 208 and 212; and shaft 264 being rotatably journalled in bars 213 and 210. As seen in FIG. 9, the shafts 261 and 263 are in the same transverse plane S of the housing, and the shafts 262 and 264 are in a second transverse plane S' of the housing. A finger 270 is keyed to each shaft and clamped thereon to extend inwardly toward the center of the housing.

Referring to centering assembly 260b in FIG. 9, it will be seen that levers 271 and 272 are keyed to each opposed pair of shafts 261 and 263, respectively, and that a rigid link 273 is pivotally connected to these levers so that when shaft 261 is swung clockwise to carry its centering finger outwardly away from the centerline of the machine, the shaft 263 is swung counterclockwise to carry its finger outwardly also. A spring 274 is connected between shaft 263 and lever 271 in a manner tending to move the centering fingers inwardly of the housing 199. A stop screw 275 mounted on the housing limits the inward movement of the fingers.

A similar spring-loaded actuating linkage is connected to each pair of opposed shafts 262 and 264 so that the attached fingers are urged inwardly of the housing.

It will be noted in FIG. 9 that the centering finger 270 on each shaft 262 is disposed laterally from the fingers on the shafts 262 of the adjacent centering units and, therefore, the fingers will not interfere with each other as they swing inwardly toward the centerline of the housing. Similarly, the centering fingers on shafts 261, 263 and 264 are disposed in offset relation.

In operation, as a pineapple is moved toward each centering unit by the pusher 140, it engages the four guide plates 225–228 which move it toward a position in which the longitudinal axis of the pineapple is substantially aligned with the longitudinal centerline of the housing 199. As the pineapple is moved through the housing, the cooperating fingers 270 of each finger assembly 260a–260f engage the pineapple and maintain its alignment in the housing. Referring to FIG. 5, it will be seen that the free end of the coring tube 24 of each processing head 25 is closely adjacent the discharge end of the centering unit 22 and is in alignment with the longitudinal centerline of the housing 199. Accordingly, the pineapple is pushed out of the housing and is impaled on the coring tube 24 which makes a cut along the axis of the pineapple to sever the core therefrom.

Processing units.—Each processing unit or head 25 comprises a housing 300 (FIG. 11) which has a top wall 301, a rear wall 302 spaced end walls 303 and 304 (FIG. 12), and a bottom wall 305. As previously mentioned, all of the processing units 25 are supported for movement in an endless path on spaced chains 26. Each housing is mounted on the chains by means of two brackets 310 and 311 (FIG. 11), each bracket having an arm 312 (FIG. 14) secured to the housing by a bolt 313 that engages a flange 314 on the top wall of the housing. A second arm 316 of the bracket underlies the housing and is secured to the bottom wall 305 by a bolt 317. Each of the chains 26 is made up of a plurality of carriages 320. (FIG. 14) connected by conventional links 318 that are pivotally connected to transverse pins 319 rotatably mounted in the spaced carriages 320. As seen in FIG. 11, each carriage is of channel shape so that the two upstanding arms (FIG. 11) of the carriage, in effect, form a link of the chain. Each carriage has two threaded studs 322 that secure the bracket 310 or 311 to the carriage. Each transverse pin 319 carries two spaced rollers 330 which ride in guide tracks 331 that are bolted to the fixed frame of the machine. These vertical guide tracks are provided at both the front and the rear of the machine to guide the heads, while they are moving upwardly along the rear of the machine, and downwardly in the forward part of the machine. As will be explained presently, processing operations are carried out while the heads move vertically in these ascending and descending runs, and the guides serve to stabilize the heads during these operations.

A coring unit 350 (FIGS. 13 and 16) is mounted in each processing head, each unit comprising a tubular shaft 351 that has one end locked by means of a nut 352 and a spacer 353 to the inner race of a ball bearing unit whose outer race is fixed in the side wall 303. The opposite end of shaft 351 fits snugly in a hole in a guide housing 356 that is pressed in the inner race of a ball bearing unit whose outer race is pressed in the side wall 304. The housing 356 is bolted to a circular flange 357 carried by shaft 351 so that rotation of shaft 351 causes rotation of housing 356. A retainer plate 358 bears against the outer race of the bearing unit to help hold it in place. The coring tube 24 has a sharpened outer end 360, and an inner threaded end that is screwed into the central portion of the guide housing 356. The coring tube has a circular flange that engages an inner peripheral area of a prong carrier 361 to lock the carrier to the housing for rotation therewith. The carrier has several projections that engage indents in housing 356 to cause the housing to drive the carrier. With this arrangement, the coring tube 24, the guide housing 356, the prong carrier 361, and the tubular shaft 351 are rotated as a unit when a gear 362, that is keyed to the shaft 351, is rotated by means of a gear train 364. The gear train includes a hub 366 (FIG. 14) that is rotatably journalled on the shaft 351 and has three radially projecting arms 367, 368 and 369. A gear 371 and a sprocket 372 are secured together and rotatably journalled on the outer end of arm 369, while a small gear 375 (FIG. 14) that meshes with gears 371 and 362, is rotatably journalled on the outer end of arm 368. A spring 377, that is connected between the arm 367 and a fixed flange plate 378, urges the hub 366 in a clockwise direction (FIG. 14) to maintain the sprocket 372 in engagement with an endless chain 380 (FIG. 1) that is secured in a channel 381 (FIG. 11). The channel is fixed to the frame of the machine and is a composite member that provides a support for the entire endless chain and positions the chain adjacent the endless path of the processing units. Thus the spring 377 of each processing unit maintains its associated sprocket 372 in engagement with the fixed chain 380 so that the sprocket and the associated gear train are rotated as the processing unit moves in its circuitous path around the machine. As a result, each coring tube 24 is continuously rotated during operation of the machine.

A core ejector rod 400 (FIG. 13) is slidably disposed in bearing sleeves in the tubular shaft 351. At the left hand end (FIG. 13), the rod 400 carries a circular disc 401 which is arranged to be engaged by a pusher roller 403 (FIG. 12) on an end of one lever 404 of a compound lever system 405 that also includes a lever 406. Both of the levers 404 and 406 are pivotally mounted on a bracket 407 that is bolted to wall 303. At one end, the level 406 carries a cam follower roller 409. A spring 410 which is connected between the bracket 406 and the lever 404 urges the lever 404 to a retracted position spaced from the disc 401 on the ejector rod. As will be explained more completely hereinafter, at a predetermined time during the upward movement of the head along the ascending run AR of its travel in the machine, a cam engages the follower roller 409, to pivot lever 406 which engages and pivots lever 404 and moves the pusher roller 403 into engagement with ejector rod disc 401. The ejector rod is thus slid along the inside of shaft 351 to push the core of the pineapple out of the coring tube 24.

After a pineapple has been peeled, it must be pushed off the core tube 24. This operation is carried out by four push rods 415 (FIG. 13) that extend through four openings 416 (only two being shown in FIG. 16) in the guide housing 356 and have notched end portions 415a disposed in slots 417 in a slide carrier 420. The carrier is a generally tubular member that is slidably journalled on the tubular shaft 351 and is locked to the inner race of a bearing unit 422 by a spacer sleeve 424 and a nut 423 which has a central hole receiving the shaft 351. A tubular outer housing 426 surrounds the slide carrier 420 and is secured to the outer race of the bearing unit 422 by a retainer ring 427. With this arrangement, the four push rods 415 can rotate with the guide housing 356 and can slide along the tubular shaft 351. It is to be noted that the outer housing 426 does not have to rotate with the rods 415 and, accordingly, this outer housing is used to slide the carrier 420 and the rods 415 along the shaft to push the pineapple off the coring tube 24.

The housing 426 is guided for movement longitudinally of the shaft 351 by a roller 430 that is secured to the housing 426 and bears against a guide bar 432 (FIGS. 13, 15 and 16). Movement of the housing 426 is effected by a carriage 450 (FIGS. 13 and 16) which has a flat body portion 451 and two tubular bosses 452 that are slidably journalled on a fixed rod 453. A chain 456, which is trained around two spaced sprockets 457 and 458 (FIG. 17) that are rotatably mounted in the carriage 450, is bolted to an upstanding tab 459 formed on the housing 426. The chain also carries a cylindrical pin 460 that is snugly received in a cylindrical opening 461 in the rear wall 302 of the main housing 300. An actuator rod 465, that has a roller 466 on one end and is slidably mounted in the wall 303, is secured, as by welding, to the carriage 450. It will be evident that, when the actuating rod 465 is moved toward the right (FIG. 13), the carriage 450 will also move toward the right. This movement of the carriage causes the chain 456 and the attached slide housing to move in the same direction as the carriage, but at a speed that is twice as fast as the speed of the carriage itself. This is due to the fact that the chain has a first increment of forward movement resulting from bodily movement with the carriage and a second increment of movement due to the fact that the chain moves around the sprockets 457 and 458.

The actuator rod 465 is moved to eject the processed pineapple from the coring tube 24 by means of a cam which will be described presently.

A cutter unit 500 (FIG. 11) is pivotally mounted on a bracket 501 which is, in turn, mounted in the main housing for reciprocating movement in a direction parallel to the axis of shaft 351. As seen in FIGURES 11 and 12, the cutter unit has an elongate rigid one-piece housing 502 that has an enlarged rear portion 502a in which an electric motor 503 (FIG. 15) is mounted by bolts 504. The cutter unit housing 502 has an upper wall 506 and a lower wall 507 which have aligned openings in which the outer races of bearing units 508 and 509 respectively are pressed. The inner race of each bearing unit receives a smooth end of a screw 512 that is threaded through a plate 513 that is bolted to the bracket 501. The screws 512 are locked in place by nuts 514. Accordingly, the cutter housing 502 is mounted in the main housing 300 for pivotal movement about an axis defined by the two screws 512.

The bracket 501 on which the cutter housing is mounted has a pair of upper tubular bosses 518 (FIG. 15) that are slidable on a fixed rod 519 which is mounted in the main frame 300 parallel to the shaft 351. A plurality of rollers 522 are secured to the lower end of the bracket and are disposed in guided relation on a rod 523 that is also fixed in the main frame and is parallel to the guide rod 519. Movement of the bracket 501 longitudinally of the housing 300 is carried out by a chain mecahnism 525 that is substantially identical to the chain mechanism that controls the movement of the four push off rods. In general, this control mechanism includes a chain 530 (FIG 18) which is trained around two sprockets 531 and 532 that are rotatably mounted on a plate 533. The chain passes through an opening in a flange 535 of one of the bosses 518 and is secured to the bracket by a screw 536 that extends through the chain and is threaded into the flange 535. The plate 533 has a pair of tubular bosses 538 that are slidably journalled on a fixed rod 539, and an arm 540 of the plate carries a cam follower roller 541 and a roller 542 that rolls along a slot 543 formed by two closer plates 544 of the housing 300. The cam follower 541 is moved back and forth from left to right (FIG. 18) as the processing head moves through the machine. Movement to the right, positions a cutter 600 carried by a housing 502 opposite the right hand end of a pineapple on the coring tube 24 (FIG. 11). Movement of the cam follower 541 to the left causes the cutter to move longitudinally of the coring tube along the surface of the pineapple to peel it. The back and forth movement of cam follower 541 is effected by a fixed cam 550 which is mounted on the frame of the machine, and which will be described in detail presently. The plate 533 is moved longitudinally in the housing 300 and, through the chain 530, causes movement of the cutter unit 500 longitudinally of the housing at twice the speed of movement of the plate 533.

A peeling cutter 600 (FIG. 21) is keyed to a shaft 601 that is journalled for rotation in a boss 602 bolted to the housing 500. A pair of nuts 603 hold the cutter on the shaft 601. A pulley 604 is keyed to shaft 601 internally of the housing 500, and a belt 605 is trained around the pulley 604 and around a pulley 606 (FIG. 18) that is keyed to shaft 607 of the motor 503. Thus, when the motor is energized, the cutter 600 is continuously rotated. As seen in FIGURE 21, the cutter is a generally disc-shaped member having a shallow trough 600a formed in one surface and a frusto-conical peripheral portion 600b on which a circular cutting edge 600c is formed, said edge having a plurality of notches (FIG. 22). A gauge 613 is mounted on a bracket 614 that is bolted to boss 602, said gauge having a fragmentary frusto-conical surface 616 which engages the surface of a pineapple P (shown in phantom lines) that is being rotated in the direction of arrow 615. The gauge 613 determines the depth of the cut made by the cutter 600. A deflector plate 617 is keyed to the shaft 601 and is provided with a frusto-conical surface 617a overlying the trough 600a in the cutter 600. The shaft 601, the cutter, and the deflector rotate in the direction of arrow 618 (FIG. 22). Accordingly, a more or less continuous peel is cut from the pineapple. The peel is directed upwardly into contact with the deflector plate 617. Due to the fact that the contact surface of the deflector is moving rearwardly, as also is the contact surface of the peeling cutter, the peel will be carried rearwardly against a curved plate 619 that is also mounted on bracket 614 and is effective to redirect the peel so that it moves in the direction of arrow 620.

The diameter and other dimensions of the cutter may vary according to the size of the pineapple that is being peeled. In one successful installation, the diameter was 3¾ inches, the height h (FIG. 21) was ¼ inch, and the angle d was between 3 and 4 degrees. Also, the distance X between a plane passing through the cutting edge 600c and a transverse plane pp passing through the axis of the coring tube was ⅛ inch.

The cutter housing 500 (FIG. 18) is caused to pivot counterclockwise, to move the cutter 600 into engagement with the pineapple, by a spring 635 that is connected between a stud 636 projecting up from the housing 500 and an extension 638 of the bracket 501. The spring is adjustably connected to the bracket 501 by means of a pin 640 that has several spaced apertures 641 through which a bolt 642 extends to lock the pin on the bracket.

During certain portions of the movement of each processing head 25 through the machine, the cutter on the head must be held in a position spaced outwardly from the pineapple. Accordingly, at predetermined positions, a cam which will be described presently, engages a roller 643a (FIG. 11) on a push rod 643 that is slidably supported in the main housing 300. A roller 643b on rod 643 engages a wear plate 644 on the cutter housing 500 and swings the housing clockwise (FIG. 18) until a latch mechanism 645 engages a linkage 646 carried by the housing. The linkage 646 is particularly shown in FIGURE 19 and includes a link 647 that is pivoted at one end to a rod 648 which is mounted in two spaced bosses 649 of the housing 500. At the other end, the link 647 is pivoted to a lower arm 651 of a rigid yoke that includes an upper arm 652 and a transverse member 653, that is pivotally mounted in a mounting tab 654 which is formed on the bracket 501. A second link 656 is pivotally connected to the upper arm 652 and to a member 658 that is pivoted at 659 to the bracket extension 638. The second link 656 has a reduced diameter portion 656a adjacent an annular shoulder 656b. A yoke 660 which is formed on a bellcrank 661 of the latch mechanism 645, is adapted to straddle the reduced diameter portion 656a and abut the shoulder 656b when a spring 663 pivots the bellcrank 661 clockwise (FIG. 18). The spring 663 is connected between the bracket extension 638 and the bellcrank, and is effective to pivot the lever about an axis defined by two aligned pins 665 and 666 (FIG. 12) that are setscrewed to bosses 667 and 668 of the bracket extension and extend into cylindrical apertures in two bosses 669 and 670 (FIG. 19) formed on the bellcrank. A roller 675 is rotatably mounted on one arm of the bellcrank and is arranged to be engaged by an abutment 676 (FIG. 11), that is mounted on the main housing 300, causing the bellcrank to swing counterclockwise (FIG. 18) against the resistance of spring 663 to move the yoke 660 from latching engagement with the shoulder 656b of the linkage 646.

One of the features of the present invention is the provision of means for maintaining the cutter in peeling contact with the rough surface of the pineapple as the cutter moves longitudinally along the surface. It will be apparent that as the gauge 613 rides along the surface of the pineapple, it will have a tendency to bounce along the surface due to the fact that, after a protuberance on the pineapple urges the gauge outwardly away from pineapple, the spring 635 swings the gauge inwardly. In accordance with the present invention a damping means is provided in the form of a hydraulic cylinder 680 which has a piston rod 681 pivotally connected at 682 to the enlarged end 502a of the cutter housing 502 and has a housing 685 pivoted at 686 (FIG. 11) to a flange 687 formed integrally on the bracket extension 638.

A conduit 690 (FIG. 20) communicates through ports in the cylinder housing 685 with chambers 691 and 692 on opposite sides of a piston 693 connected to the piston rod 681. A liquid flow control needle valve 694 is connected in conduit 690, while a ball check valve 695 is connected in a conduit 696 that bypasses the needle valve 694.

When the housing is swung inwardly, or counterclockwise FIGURE 18, by the spring 635 the piston 693 is moved to the right (FIG. 20) and fluid is pumped from chamber 692 through conduits 690 and 696 to chamber 691. It is to be noted that the check valve 695 permits relatively rapid flow of fluid in this direction. On the other hand, when the cutter housing is swung outwardly or clockwise (FIG. 18), the piston 693 is moved to the left, tending to pump fluid from chamber 691 to 692. The needle valve 694 is so set that the flow of fluid is restricted to a desired quantity such that the piston is only allowed to move slowly toward the left. Thus, the damping unit resists the movement of the gauge 613 and the cutter 600 outwardly of the pineapple and, as a result, the cutter is capable of maintaining peeling contact with the pineapple in spite of the fact that the surface of the pineapple is very irregular.

As previously mentioned, each processing head moves in an endless path around the machine. At a point indicated generally as position C (FIG. 2) and during continued movement of the head, a pineapple is forced onto the rotating coring tube of the head, the cutter of which is, at this time, in the latched position spaced outwardly from the coring tube which may also be identified as a fruit support spindle. As the pineapple moves onto the tube, it pushes the core ejector rod 400 (FIG. 13) to a retracted position, placing the disc 401 of the ejector rod actuator in the phantom line position of FIGURE 13. As the head completes its movement around the upper end of the machine and starts downwardly along descending run DR the stationary cam track 550 (FIG. 11) moves the cutter head toward the right to its initial peeling position relative to the pineapple on the coring tube. When this position is reached, the roller 675 on the latching bellcrank 661 engages the abutment 676, causing the latch to release the cutter housing and permit the spring 635 to swing the cutter into engagement with the pineapple. At this station, indicated generally as station D, an assist cam 709 (FIG. 2) engages a roller 710 (FIG. 11) on the cutter housing 502 and urges the housing counterclockwise, supplementing the action of spring 635. As the processing head moves downwardly along the descending run DR, the cutter moves along the pineapple under the control of cam track 550 to make a first peeling cut. When the cutter reaches a position indicated generally as station E in FIG. 2, the first cut is completed and a cam 712 engages the roller 643a (FIG 11) to slide the rod 643 into contact with the cutter housing 502 and move the housing to its outer position at which it is automatically locked by the spring-loaded bellcrank latch 661. As the head continues downwardly, the cam track 550 moves the cutter outwardly almost to its initial position opposite the free end of the coring tube.

The cutter head remains in its latched position as it rounds the lower end of the machine and starts up the ascending run AR. As the head approaches station F, a fixed cam track 715 moves the head all the way out to its initial position opposite the free end of the coring tube. When this position is reached, the latch is again released, and a second assist cam 714 engages the roller 710 and swings the cutter into contact with the pineapple. The stationary cam track 715 then causes the cutter to move longitudinally of the coring tube to make a second peeling cut.

Core cutter.—When the pineapple was first impaled on the rotating coring tube at station C, a cylindrical piece or plug of core material was cut from the center of the pineapple. This plug remains inside the coring tube until shortly after station F is passed. Then, at station G, a fixed cam 716 (FIG. 29) engages the roller 409 (FIG. 12) on lever 406 of the compound lever system 405 to swing the lever counterclockwise for engaging the disc 401. The ejector rod 400 is thereby moved to the right to force the core plug out of the coring tube. Station G at which the beginning of core ejection takes places is indicated in FIGURE 23. At this time the coring tube 24 is moving upwardly in synchronism with the movement of a rotary member 724 of a core cutter 725. The member 724 is a circular plate which is arranged to be rotated counterclockwise (FIG. 23) and has a centrally apertured hub 727 in which a shaft 730 is keyed. Six equi-spaced, radially disposed core receptacles 732 are integrally formed on the inner face of plate 724, each receptable being a tubular member having a generally cylindrical inner chamber 733. Five arcuate slots 735–739 extend transversely of each receptacle, the six slots 735 being spaced equal distances from the axis of shaft 730 and defining an interrupted circular passage. Similarly, each set of slots 736–739 define interrupted circular passages that are concentrically disposed around shaft 730. The core cutter also includes a circular mounting plate 745 that is mounted on the frame of the machine in spaced parallel relation to the circular plate 724, plate 745 being arranged to rotatably support shaft 730. Three arcuate guide straps 747, 748 and 749, which are integrally secured to the mounting plate 745, are formed on concentric circles about shaft 730 and are adapted to project upwardly into the interrupted circular slots defined by the slots 736, 737, and 738. Similarly, a blade 750, which has a sharpened forward end 750a, is secured to the mounting plate 745 and projects upwardly through the innermost interrupted slot defined by slots 735. A second arcuate cutter 751 is secured to the plate 745 and projects upwardly through the outermost interrupted slot 739.

As the coring tube moves upwardly from station G, the core plug is pushed out of the tube and into the registering receptacle 732. The transfer of the core plug to the receptacle is completed at about the time the core tube and the receptacle reach a horizontally aligned position. As the receptacle approaches a twelve o'clock position, the core plug slides downwardly in the receptacle until its inner end rests on the wall at the inner end of the central chamber 733 of the receptacle. Shortly after leaving the twelve o'clock position the core plug is engaged by inclined portions 747a, 748a, and 749a of the guide strips 747–749 respectively. The plug is thus moved toward the center of the chamber 733, and the contact of the plug with the upper flat surface of the three guide strip portions 747b, 748b and 749b causes the plug to move to the trailing wall 733a of the chamber. As seen in FIGURE 23, the inner blade 750 engages the inner end of the plug to cut off the end portion EP1. As the rotation of the plate 724 and the receptacles 732 continues, the plug slides outwardly of the chamber, 733 and its outer end comes into abutting contact with a fragmentary cylindrical plate 760 which is mounted in fixed position on the main frame of the machine. Then, the outer cutter 751 cuts off the outer end portion EP2 of the core plug, and this portion falls into a chute 761 that is part of a housing 762 that supports the guide plate 760 and provides two other collection chutes 763 and 764. It will be understood that the material falling into chutes 761, 763 and 764 can be collected separately if desired as by directing the material into separate containers or conveyors, or the chutes can be made part of an integrated collection system as will be described presently.

Pineapple end cutters.—As the processing head moves upwardly after the core plug has been ejected from the coring tube, a predetermined portion at the outermost end of the pineapple is cut off by a turret-type cutter 775 (FIGS. 2, 24 and 25) as the pineapple moves past the cutter at station H. As seen in FIGS. 24 and 25, the cutter 775 comprises a circular plate 776 secured to a hub 777 that is keyed to a shaft 779. The shaft is journalled for rotation in two spaced members 780 and 781 of the main frame of the machine, and has a sprocket 782 keyed to one end. The plate 776 has four equi-spaced holes 785, each of which receives one end of a guide tube 786 that is bolted to the plate. Each guide tube 786 slidably journals a shaft 789 on which a groove collar 790 and the hub 791a of a guide arm 791 are locked by a nut 792 disposed on the threaded end of a shaft 789. A roller 800 on the arm 791 rides in a groove 801 formed in a tube 802 that is secured, as by setscrews, to the hub 777, and a spring 804, that is connected between the plate 776 and the guide arm 791, urges the shaft 789 to the left (FIG. 24). A circular blade 807 and a gauge 808 are secured to the free end of shaft 789, the distance between the gauge and the cutter determining the amount that will be cut from the end of the pineapple. Spacers 810 are removably disposed between the cutter and the gauge so that the amount of cut can be changed if desired.

A linkage 815 is pivoted at 816 and 817 on a bracket 818 that is formed on each guide tube 786. Each linkage 815 has at one end a yoke 820 (FIG. 25) that has rollers 821 and 822 disposed in the groove in the collar 790, and has a roller 823 adapted to engage the face 825a (FIG. 24) of a cam 825. The cam 825 is mounted on the frame member 781 and has a generally semi-circular camming surface (FIG 25) that is formed on a circle having shaft 779 as center. Since the camming surface does not define a complete circle, each linkage will pass out of contact with the camming surface during the circular movement of the linkage with the associated shaft 789. When the linkage is not under the control of the cam 825, the spring 804 is free to slide the shaft, and the cutter and gauge thereon, along the guide tube 786.

The lowermost cutter unit FIGURE 25 will be referred to as cutter 775A. It will be noted that each gauge 808 is an elongate member having a flat blade-like end portion 808a, a central portion defining an arcuate recess 808b, and an inner end portion that receives the shaft 789. The cutter unit rotates counterclockwise (FIG. 25) around the axis of the central shaft 779 and, just before the cutter unit 775A reaches the position shown in FIGURE 25, the roller 823 of the associated linkage 815 is still riding on the cam 825. At the point, the outer end 808a of the gauge 808 is in alignment with a pineapple P carried on a coring tube 24 that is moving upwardly as indicated by arrow 830. As the turret continues to rotate counterclockwise (FIG. 25) the roller 823 moves out of engagement with the cam 825, as seen in FIGURE 25. The spring 804 immediately slides the shaft 789 in the tube 786 until the end 808a of the gauge abuts the end of the pineapple. It should be noted that, at this time, the circular blade 807 is a considerable distance away from the pineapple. However, during continued rotation of the turret and while the gauge is still in engagement with the end of the pineapple, the blade engages and cuts into the pineapple. Since the pineapple is rotating with the core tube, the blade does not have to move completely across the pineapple but only to a point where the leading edge of the blade is close to but not in contact with the coring tube. As the pineapple continues its upward movement and the blade and gauge continue in their circular path, the pineapple moves out of engagement with the gauge and blade, leaving the severed end portion of the pineapple on the coring tube with the main portion of the pineapple.

It will be evident that the roller 823 of the control linkage will engage the surface 825a of the cam 825 and the cutter will be retracted to the position shown by the cutter unit identified as unit 775B in FIGURE 24. The portion of the camming surface 825a that is engaged by the roller 823 will depend upon the position of the gauge 808 during the cutting operation. If a pineapple that is smaller than the pineapple of FIGURE 24 is on the coring tube, the roller 823 will be moved further to the right than the position shown in FIGURE 24 and will engage the camming surface sooner than indicated by the operational arrangement shown in FIGURE 24.

As the pineapple continues upwardly, its inner end P2 (FIG. 24) moves into engagement at station J with the sharpened edge 840 (FIGS. 3 and 3A) of a blade 841 that is mounted in fixed position in the machine by bolts 842. Although the second peeling cut of the rotary cutter 600 is still taking place, there will be no interference between the rotary cutter 600 and the fixed blade 841 because, as seen in FIGURE 3, the cutter 600 engages the surface of the pineapple on the opposite side of the coring tube from the side engaged by blade 841. The cutting edge of the blade 841 is slanted upwardly and inwardly and it cuts into the pineapple to a point adjacent the coring tube so that the end P2 of the rotating pineapple is severed from the body of the pineapple. In order that the end P2 is completely severed from the body of the pineapple, an annular recess 844 (FIG. 16) is provided in the coring tube to receive the inner edge of the blade.

Just after the end P2 is cut from the pineapple, the rotary cutter 600 completes its second peeling cut, and a fixed cam 843 (FIG. 26) engages the roller 643a on the slide rod 643 at station K to actuate the rod to move the cutter housing 500 to its outer latched position. The cored and peeled pineapple is now ready to be removed from the coring tube. Accordingly, at this time, the roller 466 (FIGS. 11 and 12) engages a cam track 850 (FIG. 30) that is mounted in fixed position in the machine adjacent the path of movement of the processing heads. The roller 466 is moved inwardly of the head to shift the four ejector rods 415 (FIG. 13) to the right to push the pineapple off the coring tube at station L. The rods are moved to retracted position by the cam track 850 immediately after the discharge of the pineapple. It will be noted in FIGURE 30 that, during the movement of each head upwardly along ascending run AR, the roller 466 of the ejector mechanism was disposed behind a fixed retainer strip 851 which prevented ejection of the pineapple as the head moved upwardly.

Arrangement of control cams.—FIGURES 26–30 show in diagrammatic form the location of the various cams used to obtain the above-mentioned operation of the machine. As previously mentioned, the first assist cam 709, the cam track 550 which moves the cutter longitudinally of the pineapple during the first pealing cut, and the latching cam 712 are mounted in fixed position along the descending run DR of the endless path of movement of the head. In FIGURE 27, the cam track 550 is shown as having an inclined upper portion UP that causes the cutter to be moved to its initial position opposite the outer free end of the coring tube just before station D is reached. An oppositely inclined intermediate portion IP is effective to move the cutter inwardly along the surface of the fruit during the first peeling operation, and an oppositely inclined LP which returns the cutter almost all the way to its outer position opposite the free end of the coring tube in preparation for the next peeling cut.

As the head moves around the lower end of the machine, the position of the cutter on the head is maintained by a curved cam track 852.

Along the ascending run AR, the second assist cam 714 is mounted in a position to urge the cutter inwardly when it is unlatched at station F; the cam 716, which is best shown in FIGURE 29, is mounted in fixed position to actuate the core ejector at station G; the cam track 715 is arranged to complete the movement of the cutter to its initial position and to control the movement of the cutter longitudinally of the coring tube during the second peeling cut; the cam 843 is positioned to latch the cutter at station K when the second peeling cut is finished; the cam 850 is mounted in position to actuate the pineapple ejecting mechanism at station L; and a fixed cam bar 855 is arranged to maintain the retracted position of the peeling head as it moves around the upper end of the machine.

In FIGURE 28, the cam track 715 is shown as having a short inclined section LP–1 that engages fol'ower roller 541, completes the movement of the cutter head to its outer projected position, and an elongate slanted upper portion UP–1 that is effective to move the cutter inwardly along the surface of the pineapple during the second peeling cut. Also, the fixed cam bar 855 engages the follower roller 541 and holds the cutter in the retracted position it assumes on completion of the peeling cut.

Drive mechanism.—The drive mechanism for the machine, which is shown diagrammatically in FIGURE 31, includes a motor 875 which is connected in a conventional manner to a gear reducer 876 that has an output shaft 877. A countershaft 878 is driven from shaft 877 by means of a chain 880, said countershaft having four sprockets 881, 882, 883 and 884 keyed thereon. Sprocket 881 is connected, by means of a chain 888 and a sprocket 889, in driving engagement with the shaft 125 that drives the transfer turret reel 100 and the sprockets 129, 130 that drive the endless chains 26 on which the several processing heads 25 are mounted.

The second sprocket 882 on countershaft 878 is connected by means of a sprocket and chain mechanism 892 with the drive shaft 56 of the feed conveyor 50. The third sprocket 883 is operatively connected through a conventional right angle drive unit 894 and a sprocket and chain drive 895 to the shaft 730 of the core cutter 725. The fourth sprocket 884 on countershaft 878 drives an auxiliary shaft 900 through a chain and sprocket drive 901, and the auxiliary shaft in turn drives the shaft 779 of the turret type pineapple end cutter 775 by means of a chain and sprocket drive 902. The auxiliary shaft 900 is also connected through a gear mechanism 904 and a chain drive 905 to a tubular shaft 906 that is integrally formed on a sprocket 907 and is journalled for free rotation relative to the shaft 125.

The tubular shaft 906 is part of an automatic take-up mechanism for a flexible electric cord 910 (FIG. 12) which delivers electrical energy to each motor 503 of the twenty two processing heads. In accordance with the present invention the electric cord 910 is electrically connected in a terminal box 912 in only one of the heads 25, namely the head illustrated in FIGURE 12 which will be referred to hereinafter as the core-control head, an electric cord 913 is connected from the terminal box 912 of the cord control head to a similar box on the next adjacent head so that electric power is made available to said adjacent head which, in turn is connected to the next head in the endless array of heads on the conveyor chains 26. With this arrangement, power is delivered to the terminal box 912 on each of the twenty-two heads. The cutter drive motor 503 of each head is electrically connected to the terminal box 912 by means of an electrical cord 915 which has several loops disposed around a fixed support rod 916 on the head. These extra loops of cord permit movement of the peeling head back and forth during the peeling operations.

As seen in FIGURES 11 and 12, the cord 910 is guided into the terminal box 912 through a hollow member 920 that has a tubular shank 921 secured to the terminal box and communicating with the interior of the box through a hole in the side wall of the box. The guide member has a funnel like end portion 922 (FIG. 32) that communicates with the tubular portion 921 and has opposed curved entry portions that permit the cord to shift from side to side in the guide member as the head moves around the machine. As seen in FIGURE 5, the end of the cord 910 that projects from the funnel 920 is wrapped around a reel 925. This reel is made of a non-conductive material and is rotatably journalled, as seen in FIGURE 33, on the tubular shaft 906 which, as mentioned previously, is journalled for rotation relative to shaft 125. Each of three electrical conductors carried by the cord 910 is connected to a slip ring 930 that is secured to the reel 925 for rotation therewith, and each slip ring engages one of three brushes 931 carried by a brush holder 932. The brush holder 932 is mounted on the frame of the machine adjacent the reel 925, and an electric conductor 934, which is connected to a suitable source of power, is operatively connected through the brush holder to three conductors 933 that are associated with the brushes 931.

As previously mentioned, the sprocket 907 is continuously rotated during operation of the machine. Three drive members 940 (FIG. 34) are pivotally mounted on one face of the sprocket, each member 940 having an arcuate drive surface 941 that is urged by a spring 942 into engagement with a ring 943, secured to reel 925. Each spring 942 is anchored at one end in a tab 944 projecting from the sprocket 907. Accordingly, the continuously rotating sprocket 907 maintains a continuous turning force on the reel 925, said force being effective to tend to rotate the pulley clockwise (FIG. 32). It will be noted that, as the cord-control head 25 moves downwardly along the descending run DR, the cord 910 is unwound from the reel 925 which turns counterclockwise against the resistance of the friction drive of the sprocket 907. However, when the head passes around the lower end of the machine and starts up the ascending run, the cord is automatically shortened due to the fact that the sprocket 907 rotates the reel clockwise to wind the cord onto the reel.

Air control system.—Each of the six pusher members 140 that are carried by the transfer turret 23 is moved forwardly to push a pineapple through the associated centering unit and onto a coring tube by the double acting pneumatic cylinder 151 (FIG. 5) associated with the pusher. After the pineapple is on the coring tube, the pusher is retracted by the cylinder 151. The pushers must be actuated in sequence and, in FIGURE 35, a cylinder 151 that is associated with the pusher that happens to be at the transfer station C is indicated at CYL. 1, the other cylinders being indicated as CYL. 2–CYL. 6 respectively in clockwise order. Since the actuation of the cylinders occurs in a predetermined repetitive order, it will be necessary only to disclose the valves and air conduits associated with cylinders CYL. 1, CYL. 3 and CYL. 5 for a complete disclosure of the construction and operation of the entire air control system.

As seen in FIGURE 5, the shaft 125 is provided with a central passage 950 that communicates with the annular chamber 154. At the left end of the shaft 125 the passage 950 communicates through a coupling (not shown) with a source of air under approximately 50 p.s.i. pressure. Since the shaft 125 rotates and the air supply is a non-rotating unit, a conventional coupling that permits this relative rotation while maintaining air-tight contact must be used.

The sleeve 155 surrounding the air chamber 154 is provided with six equi-angularly spaced tapped holes 952 (FIG. 35) each hole being adapted to receive a fitting 953 of the air control system associated with a particular one of the six power cylinders.

Each air control system includes a pilot valve and a control valve, the pilot valve of the cylinder CYL. 1 being identified as PV–1 and the control valve of cylinder CYL. 1 being identified as CV–1. Each of the six control valves is mounted on a flange 956 projecting from the mounting plate 153, while each pilot valve is secured directly to the plate 153. In order to efficiently arrange the system, the pilot valve in the control circuit of a particular power cylinder is spaced from its associated control valve.

A conduit 960 (FIGS. 35 and 36) connects the fitting 953 to the pilot valve PV–1, in air-flow communication and a conduit 961 connects the fitting to the control valve CV–1. A conduit 962 connects PV–1 to a passage in a terminal block 964 that is formed integral with CV–1 and communicates with a conduit 965 (FIG. 36) leading to CV–1. Two conduits 967 and 968 connect CV–1 to opposite ends of the power cylinder CYL. 1. As will be explained presently, the conduit 962 from PV–1 shifts the valve CV–1 in one direction to effect one control setting, and it is moved in the opposite direction to its initial setting by means of a conduit 966 connected to the control valve of a following cylinder. For example, CV–1 is moved in one direction by air in conduit 965 when PV–1 is actuated by a fixed cam 970. However CV–1 is not returned to its initial setting until PV–3 is actuated to direct air through the associated terminal box 964 and conduit 966 to CV–1. Therefore, each conduit 962 leading from a pilot valve communicates inside the associated terminal block 964 with a conduit 966 leading to a preceding control valve. Since, as seen in FIGURE 35, the conduit 966 connected into the terminal block of CV–1 originates in the terminal block of CV–3, and since the plate 153 must rotate 120 degrees of counterclockwise rotation between the time PV–1 is actuated until the time PV–3 is actuated, CV–1 will be moved from its initial setting when PV–1 is actuated and will be returned to this setting after 120 degrees of rotation. It will be understood that the movement of CV–1 from its initial setting when PV–1 is actuated will cause the associated pusher 140 to move a pineapple through a centering unit and onto a coring tube; return movement of CV–1 to its initial setting will cause retraction of the pusher.

Referring to FIGURE 36, it will be noted that conventional diagrammatic symbols are used for the pilot valves PV–1 through PV–6 and for the control valves CV–1 through CV–6. Each pilot valve has two settings indicated by boxes A and B respectively. When the cam follower 971 of the valve engages the fixed cam 970, the valve is shifted to the setting indicated by box A wherein the pressure conduit 960 is connected in flow communication with conduit 962 through a straight passage in the valve. As soon as the cam follower moves out of engagement with cam 960, a spring associated with the valve moves it to the setting indicated by box B wherein conduit 962 is vented to atmosphere. Although valve PV–1 is held in setting A for only a short time, it is during this interval that air is directed to CV–1 to change its setting.

Each control valve has two settings indicated by boxes P and R. When box P is aligned with the power conduit 961 due to air from 965, air under pressure from conduit 961 is directed through slanted passage S and conduit 968 to one end of power cylinder CYL. 1 to move the pusher 140 to a "projected" position and conduit 967 will be vented. When the valve has been shifted by air from conduit 966 to the box R setting, as shown in FIGURE 36, air under pressure from conduit 961 is directed into conduit 967 to shift the pusher 140 to "retracted" position, while conduit 968 is vented.

In summary and with reference to FIGURE 36, when PV–1 is actuated by cam 970, the valve is moved to the box A setting and pressurized air is directed through conduit 962 to terminal block 964. From block 964 the air is directed through passage 965 to valve CV–1 to shift it to box P position, causing pusher 140 to be projected. Also, air is directed from block 964 through conduit 966 to CV–5 to shift CV–5 to its box W position causing the pusher 140 associated with cylinder CYL. 5 to be retracted.

After 120° of rotation of the valves, cam 970 actuates the follower 971 of pilot valve PV-3, and air under pressure is directed to control valve CV-1 to move it to its box R position, retracting pusher 140 associated with CYL. 1.

Each pilot valve may be of the type marketed by Numatics Inc., Highland, Mich., as Model OCLA3-2 while each control valve may be of the type marketed by the same organization as Model JDPA4.

Product collecting system.—Referring to FIGURES 21 and 22, it will be noted that the peel leaving the guide member 619 in a more or less continuous ribbon of peel about ¼ inch in thickness is directed against a vertical rear wall 985 of a vertical chute 986 that is mounted on the frame of the machine opposite the descending run DR of the processing units. Near its lower end, the vertical chute 986 (FIG. 2) has a slanted forward wall 987 that intercepts the downwardly falling peel and directs it onto a power-driven endless belt conveyor 990 that carries it to a subsequent processing machine or the like.

As the processing unit moves upwardly along the ascending run AR, the cutter makes its second cut in the surface of the pineapple. During this cut, a layer of flesh about ¼ inch in thickness is removed in short strips and directed against a vertical chute 991 that is similar to chute 986 but oppositely disposed. At the lower end of the chute, an inclined wall 992 directs the short strips and fragments into a downwardly inclined trough 993. The trough underlies the path of upward movement of the cutters so that juice, which is released during the second peeling cut, will drop directly downwardly into the trough and be carried away with the short strips and fragments of flesh. If desired, the upper run of an endless belt conveyor may move through the trough in a direction to facilitate the removal of the juice, and flesh portions.

As seen in FIG. 23, the core cutter 725 is mounted adjacent the path of upward movement of the cutters, and the central part of the core is discharged downwardly through chute 763, while the ends drop down through chutes 761 and 764. Accordingly, the trough 993 is made wide enough to underlie the chutes 761, 763 and 764 to receive the core pieces therefrom. In some cases it is desirable to collect the core ends EP1 and EP2 separately. In such cases downwardly slanted deflector plates, similar to the inclined wall 992 on chute 991, can be attached to the lower ends of the chutes 761 and 764 to guide the core end portions to a collecting device, such as a bin, that is spaced from the trough.

When the peeled pineapple and the two severed end portions of the pineapple are pushed off the coring tube at the discharge station, they are received in a slanted chute 995 (FIGS. 1, 2 and 3) that is disposed below the orbital path of movement of the centering heads 22 and between the feed conveyor 21 and the vertically moving coring tubes. The chute 995 directs these pineapple parts to a separating table or a conveyor which takes them to a subsequent processing station.

It is to be noted that with the above described collection system, the peel which is usable only for animal feed and sugar recovery is collected at one location, the short strips of peel formed during the second peeling cut and the core are collected at a second location since they are primarily usable for juice, and the peeled central body portion of the pineapple is collected at a third location. Thus, the present machine is effective to automatically segregate the three products. In accordance with the method of the present invention, the central body portion of the pineapple with its contour-peeled surface is placed in a machine of the type disclosed in the United States patent to De Back et al. No. 2,765,829. In this type of machine a pusher conveyor forces the pineapple through a cylinder that has a sharpened leading edge so that the pineapple is divided into a solid cylindrical central portion suitable to produce sliced pineapple and an annular member that is suitable for use as crushed or chunk pineapple.

Operation.—Although the operation of the machine has been described in connection with the description of the various mechanisms, it will be summarized to emphasize the coordinated action of the entire machine for effectively peeling pineapples. As seen in FIGS. 1 and 2, each pineapple is placed on a pocketed carrier of the feed conveyor 21 at station A and is carried upwardly to station B where the fingers of one of the pick-up units 115 on transfer turret 23 move into the carrier to lift the pineapple out of the carrier and upwardly along the curved plate 112 to the transfer station C. At station C the pusher 140, associated with the particular pick-up unit 115, moves from right to left (FIG. 1) to transfer the pineapple from the pick-up unit to the centering mechanism 22 that is rotating with the pusher 140. As the pineapple is moved through the centering unit, it is oriented so that its core axis is horizontal.

The twenty-two processing heads 25 are moved along their endless path in timed relation with the movement of the centering units 22 and, at station C, the coring tube 24 on one of the heads is in axial alignment with one of the centering units in which a pineapple is held. Accordingly, the pusher 140 that moves the pineapple into the centering unit continues its forward movement and forces the pineapple onto the coring tube 24 of the aligned processing head. Referring to FIG. 29, it will be noted that, as the head starts down the descending run DR, the cam track 550 first moves the cutter to its projected position opposite the outer end of the coring tube. As the cutter reaches this projected position, it is unlatched and swung inwardly toward the pineapple by the spring 635 and by the assist cam 709.

Since the cutter is being continuously rotated, it begins to peel the pineapple on the rotating coring tube as the head moves downwardly, and the cam track 550 causes the cutter to move longitudinally along the rotating pineapple. When the cutter has traversed the length of the pineapple, the cam 712 engages the cutter head and moves it outwardly to latched position. The cam track 550 then moves the cutter outwardly toward its projected position but it stops this outward movement before the unlatching position is reached.

The processing head moves around the lower end of the machine and, as it starts upwardly along the ascending run AS, the cam 715 completes the outward movement of the cutter to projected position, causing the cutter to be unlatched at station F. The second assist cam 714 immediately moves the rotating cutter inwardly to engage the rotating pineapple on the rotating coring tube. During an initial portion of the upward movement of the processing head, the cam 853 engages the compound lever system 405 and effects the outward movement of the ejector rod 400 at station G to push the core plug of the pineapple into the rotating core cutter 725.

At station H, the turret-type cutter 775 (FIG. 2) cuts off the outer end of the rotating pineapple, and at station J the fixed blade 841 cuts off the inner end of the pineapple. When station K is reached the peeling cutter has completed its second peeling cut along the surface of the pineapple and the cam 842 pivots the cutter outwardly to its latched position.

At station L the cam 850 engages the pineapple ejector rod and moves the four push-rods outwardly along the coring tube to push the pineapple and the two severed end portions off the tube. The coring tube is then ready to receive another pineapple when it reaches station C.

From the foregoing description it will be apparent that the present invention provides a completely new method of processing fruit such as pineapples. The use of a rotary cutter that is capable of contour-peeling pineapples makes it possible for the first time to obtain the maximum amount of sliced pineapples and the maximum amount of solid pack pineapples. Further, the use of a dampening mechanism with the rotary cutter mounting means has made the peeling of the rough surface of a pineapple with a rotating knife practicable. Again, the provision of a cutter control mechanism that is effective to hold the cutter in peeling contact during movement of the cutter along the pineapple in one direction and is effective to hold the cutter spaced from the fruit as the cutter moves in the opposite direction has made it possible for the first time to cut successive layers from a rotating fruit by means of a rotating cutter.

In FIG. 37 a second embodiment of the pusher mechanism for loading each pineapple onto the coring tube 24 of the machine, described in connection with FIGS. 1–36, is illustrated. The mechanism of FIG. 37 is substantially identical to that shown in FIG. 5 and may be substituted for the mechanism of FIG. 5. Accordingly, the parts of the apparatus of FIG. 37 that correspond generally or specifically to the parts shown on FIG. 5 will be given identical reference numerals followed by a suffix A. The pusher mechanism 140A comprises a tubular center member 141A that is slidably supported on one of the fixed rods 110A. Two pineapple-contacting rollers 142A are rotatably mounted on a bracket 143A that is secured to the end of a support arm 144A carried by and projecting from the center member 141A radially of the turret axis. A second arm 145A, projecting from the center member 141A, carries a rotatable guide roller 147A and is pivotally connected at 148A to the piston rod 150A of a double-acting power cylinder 151A.

The pushing mechanism 140A differs from the pusher 140 in that a coil spring 1000 is disposed around shaft 150A with its ends abutting two spaced washers 1002 and 1003 that also encircle the shaft 150A. The arrangement is such that the pusher moves the pineapple onto the coring tube in two steps, the first step being effective to force the pineapple P onto the stemming tube 24A with maximum force and the second step being effective to force the pineapple onto the driving fins or prongs 1004 on the prong carrier 361A with a force that is reduced by the resistance of the spring 1000. In FIG. 37 a position is shown at which the spring is resisting the forward movement of the pusher. In a satisfactory arrangement, air pressure at 50 p.s.i. was arranged to act on the piston in cylinder 151A and move the pineapple onto the coring tube with a force of 75 pounds. The spring 1000 was chosen and positioned so that it would come into operation after the pineapple was on the coring tube and before it reached the drive fins 1004, the spring being effective to exert 30 pounds of resistant to the forward movement of the pusher. Accordingly, while the pineapple was forced onto the coring tube with a pressure of 75 pounds, it was forced onto the fins by a pressure of only approximately 45 pounds. This two-step loading of pineapples onto a coring tube or impaling rod is of particular importance when relatively soft fruit is being processed since the forcing of soft fruit against the prong carrier 361A with excessive force will crush the fruit.

In FIGURES 38, 39 and 40, a second embodiment of the processing heads used on the machine of FIGURES 1–36 is shown. This modified head is substantially identical to the head 25 shown in FIGURES 11 and 12 and may be substituted therefor. Accordingly, parts of the modified head 25A, that correspond generally or specifically to parts of head 25, will be given identical reference numerals followed by a suffix A.

It should be noted in comparing FIGS. 11 and 39 that, while the cutter 25 of FIG. 11 is shown after a peeling cut has been made, the cutter 25A of FIG. 39 is shown in approximately the middle of a peeling cut.

The modified head 25A features a mechanism whereby the cutter 600A is urged against the pineapple with maximum pressure during the first cut along the tough surface of the pineapple and is urged against the soft exposed surface of the pineapple with reduced pressure during the second or juice cut.

Referring to FIG. 39, it will be seen that the spring 635A, which swings the head counter-clockwise about the axis X defined by screws 512A (one only being shown), is connected at one end to the stud 636A of a bracket 1008 which corresponds in general to bracket 638 except that an aperture 1009 is provided in an end wall adjacent four mounting tabs 1007. The spring 635A extends through aperture 1009 and is connected to one arm 1010 (FIG. 40) of a lever 1011. The lever 1011 is mounted for free pivoting movement on a pin 1012 that is secured to two of the spaced tabs 1007 formed on the housing 1009. A roller 1014 is rotatably mounted on a second arm 1015 of lever 1011, and a fixed pin 1016 projects laterally from a third arm 1017. A second lever 1020 is pivotally mounted on a fixed pin 1021 which is disposed between two spaced tabs 1007 projecting from the housing 1009. The second lever has a roller 1022 rotatably mounted on one arm 1023 and is provided with a hooked end 1025 on a second arm 1026.

It will be noted in FIGS. 39 and 40 that the pivot pins 1012 and 1021 are actually disposed in parallel planes passing transversely through the pivot axis X. However, in the schematic showing of FIG. 38, the pins 1012 and 1021 are illustrated in planes parallel to the axis X to more clearly disclose the interaction of the levers 1011 and 1020.

In FIG. 38 a position of the head is shown during the first or mill cut along the relatively tough surface of the pineapple. It should be noted that, at this time, the hooked end 1025 of lever 1020 is engaged over the pin 1016 so that the lever is held against pivoting and provides a fixed anchor for spring 635A which is effective to swing the cutter 600A inwardly as the cutter moves in the direction of arrow A toward the end of the pineapple. Referring to FIGS. 26 and 27, it will be noted that this first cut occurs as the head moves along the descending run DR of the endless path of movement of the heads and that, during this movement, the cutter is under the control of the intermediate portion IP of the cam track 550 so that the cutter progressively moves along the surface of the pineapple. When the first cut has been completed, the cutter is returned almost to its outer position opposite the free end of the coring tube by the cam section LP. The cutter is held in this position, as the head moves around the lower end of the machine, by the curved cam track 852.

As the head moves around the lower end of the machine a cam 1030 (FIG. 38), that is mounted in fixed position on the frame of the machine and has an inclined surface disposed in the path of movement of roller 1022, is engaged by the moving roller 1022 with the result that the lever 1020 is pivoted about pin 1021 to withdraw the hook end 1025 from engagement with the pin 1016. When the lever 1011 is released, it pivots about pin 1012 until the lever arm 1010 engages a fixed stop bar 1031 (FIG. 40) mounted on the housing 1008. It will be evident that this pivoting movement of lever 1011 relaxes the spring 635A so that, when the second peeling cut is made on the pineapple, the cutter is urged against the exposed flesh with reduced pressure. It has been found that efficient peeling of the pineapple can be obtained if the spring 635A, the lever system, and the head are so designed that the cutter is urged against the relatively tough outer skin with a pressure of approximately 40 ounces and is urged against the exposed flesh during the second cut with a pressure of approximately 25 ounces.

The second peeling cut is made as the head moves along the ascending run AR of the endless path of movement of the heads, and it is completed before the head reaches Station K (FIG. 26). Since the peel cutter is not moved into engagement with the fruit again until just before Station D is reached, the lever 1011 may be moved back to latched position at any time before the cutter is swung inwardly toward the fruit just before Station D is reached.

In one embodiment a cam (not shown) that is similar to cam 1030 is mounted in fixed position in the frame so that its slanted camming surface is disposed in the path of movement of the roller 1014 (FIG. 38) as the associated head moves around the upper end of the machine. The roller 1014, which at this time is in unlatched position clockwise from the position of FIG. 38, engages the slanted camming surface of the fixed cam, causing the lever 1011 to be pivoted counterclockwise against the resistance of spring 635A. As the lever 1011 swings to a predetermined point, a spring 1040 which is connected between the lever 1020 and the bracket 1008, pivots the lever 1020 clockwise to move the hook end 1025 into latching position relative to the pin 1016.

While the machine of FIGS. 1–36 has been described as employing a coring tube 360 which cuts a center plug out of the pineapple as the pineapple is pushed onto the tube, it is within the scope of the present invention to carry the pineapple through the machine on a solid cylindrical impaling pin having a diameter of approximately one-quarter inch. The prongs or drive fins would, of course, be provided at the base of the impaling pin to drivingly engage and cause rotation of the pineapple as it moves through the machine. When a head is equipped with an impaling pin rather than a coring tube, the core ejector rod 400 (FIG. 29), the rod-actuating lever system, and the cam 716 will of course be removed. Similarly, the core cutter 725 and associated mechanisms may be eliminated. Also, the pineapple end cutters 841 and 775 will be adjusted to cut close to the impaling pin so that the ends of the pineapple will be cut free from the body.

Accordingly, the present invention includes a method of processing pineapple which comprises the steps of positioning a pineapple in centered position on a solid rotatable impaling pin, contour-peeling the pineapple as the pin is rotated, cutting off the end portions of the pineapple, and ejecting the peeled pineapple from the pin with its core substantially intact.

Further, while a method of processing pineapples has been disclosed wherein the outer portion of the pineapple is removed in two peeling steps, namely, a first mill cut and a second juice cut, it is within the teaching of the present invention to peel the pineapple during a single pass of the cutter along the surface of the fruit. The cutter 600a and the gauge 613 will of course have to be adjusted to obtain the desired thickness of peeling during this single cutting operation.

While a particular embodiment of the invention has been shown and described, it will be understood that the present machine and method is capable of variation without departing from the principles of the invention, and that the scope of the invention should be limited only by the scope and proper interpretation of the claims appended hereto.

Having thus described the invention what is claimed as new and what is desired to be protected by Letters Patent is:

1. In a method of preparing pineapples, the steps of making a first peeling cut along the surface of the pineapple to remove skin material suitable for animal feed and to expose a subsurface portion of the flesh of the pineapple, making a second peeling cut along said exposed portion to provide a contour-peeled central body section and to remove a layer of the flesh suitable for the extraction of juice therefrom, cutting a portion from each end of the body section, directing the skin material and the flesh to separate locations, cutting a core plug from the pineapple, collecting the core plug with the flesh preparatory to removing juice therefrom, and directing the body section and the end portions at a third collection station.

2. In a method of processing pineapple the steps of contour-peeling the pineapple to remove the skin, and expose the flesh of the pineapple, collecting the skin, making a contour cut in the exposed flesh to remove a layer of flesh and to provide a contour-peeled central body section, collecting the flesh at a collecting zone separate from the zone at which the skin is collected, and making a cylindrical incision in said central body section to divide the section into a central, generally cylindrical inner section suitable for use as sliced pineapple and a generally annular portion suitable for crushed pineapple.

3. In a method of processing pineapple, the steps of contour-peeling the pineapple to remove the skin and expose the flesh of the pineapple, collecting the skin, making a contour cut in the exposed flesh to remove a layer of flesh and to provide a contour-peeled central body section, collecting the flesh at a collecting zone separate from the zone at which the skin is collected, removing the core from said body section, and making a cylindrical cut in said body section extending along the entire length thereof to divide said body section into an inner section suitable for use as sliced pinapple and an outer section suitable for use as crushed pineapple.

4. The method of peeling a cored pineapple comprising the steps of supporting the pineapple from one end only along its core hole, contour peeling the pineapple, trimming the free end of the supported pineapple, and rotating the pineapple while advancing it across a fixed knife for trimming the pineapple at its supported end.

5. The method of peeling a pineapple comprising the steps of rotating the pineapple about its axis, contour peeling the shell from the pineapple by axially advancing a cutter in one direction, and contour peeling the eyes from the pineapple by axially advancing the cutter in the opposite direction.

6. The method of claim 5, comprising applying the cutter to the pineapple during the eye removal contour peeling with less force than that applied by the cutter to the pineapple during the shell removal contour peeling.

References Cited

UNITED STATES PATENTS

| | | | |
|---|---|---|---|
| 1,590,162 | 6/1926 | Hargreaves | 146—6 |
| 1,984,709 | 12/1934 | Taylor | 146—6 |
| 2,361,241 | 10/1944 | Rogers | 146—37 X |
| 3,036,920 | 5/1962 | Farmer | 146—241 X |

W. GRAYDON ABERCROMBIE, Primary Examiner

U.S. Cl. X.R.

146—6, 241